US012706656B2

(12) United States Patent
Gao et al.

(10) Patent No.: US 12,706,656 B2
(45) Date of Patent: Aug. 11, 2026

(54) SYSTEMS AND METHODS FOR UPLINK FREQUENCY SELECTIVE PRECODING

(71) Applicant: ZTE CORPORATION, Shenzhen (CN)

(72) Inventors: Bo Gao, Shenzhen (CN); Zhaohua Lu, Shenzhen (CN); Ke Yao, Shenzhen (CN); Minqiang Zou, Shenzhen (CN); Chuangxin Jiang, Shenzhen (CN); Meng Mei, Shenzhen (CN); Yang Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 322 days.

(21) Appl. No.: 18/489,290

(22) Filed: Oct. 18, 2023

(65) Prior Publication Data

US 2024/0137091 A1 Apr. 25, 2024
US 2024/0235644 A9 Jul. 11, 2024

Related U.S. Application Data

(63) Continuation of application No. PCT/CN2021/118117, filed on Sep. 14, 2021.

(51) Int. Cl.
*H04W 28/06* (2009.01)
*H04B 7/0456* (2017.01)
(Continued)

(52) U.S. Cl.
CPC ......... *H04B 7/0639* (2013.01); *H04B 7/0478* (2013.01); *H04L 1/0003* (2013.01); *H04W 72/1268* (2013.01); *H04W 72/51* (2023.01)

(58) Field of Classification Search
CPC .. H04B 7/0469; H04B 7/0478; H04B 7/0628; H04B 7/063; H04B 7/0639;
(Continued)

(56) References Cited

U.S. PATENT DOCUMENTS

2018/0183503 A1 6/2018 Rahman et al.
2019/0181934 A1* 6/2019 Kang .................... H04W 72/20
(Continued)

FOREIGN PATENT DOCUMENTS

CN 106656292 A 5/2017
CN 110535589 A 12/2019
(Continued)

OTHER PUBLICATIONS

Extended European Search Report for EP Appl. No. 21956990.2, dated Jul. 26, 2024 (7 pages).
(Continued)

*Primary Examiner* — Phuc H Tran
(74) *Attorney, Agent, or Firm* — Foley & Lardner LLP

(57) ABSTRACT

Presented are systems and methods for uplink frequency selective precoding. A wireless communication device may receive a first signaling from the wireless communication node. The first signaling may include a plurality of precoding information associated with a plurality of port groups. The wireless communication device may determine signals precoded according to the plurality of precoding information. The wireless communication device may transmit the signals to the wireless communication node.

14 Claims, 12 Drawing Sheets

1250

(51) Int. Cl.

| | |
|---|---|
| ***H04B 7/06*** | (2006.01) |
| ***H04L 1/00*** | (2006.01) |
| ***H04W 72/1268*** | (2023.01) |
| ***H04W 72/51*** | (2023.01) |

(58) Field of Classification Search

CPC ....... H04B 7/0691; H04B 7/10; H04L 1/0003; H04W 72/1268; H04W 72/51

See application file for complete search history.

(56) References Cited

U.S. PATENT DOCUMENTS

| | | | | |
|---|---|---|---|---|
| 2020/0036425 | A1* | 1/2020 | Ren | H04L 5/0091 |
| 2020/0106559 | A1* | 4/2020 | Vilaipornsawai | H04L 1/1896 |
| 2020/0313827 | A1* | 10/2020 | Noh | H04L 5/0023 |
| 2025/0212209 | A1* | 6/2025 | Gao | H04B 7/0404 |

FOREIGN PATENT DOCUMENTS

| | | | |
|---|---|---|---|
| JP | 2013-520913 | A | 6/2013 |
| JP | 2020-504487 | A | 2/2020 |
| JP | 2020-509677 | A | 3/2020 |

OTHER PUBLICATIONS

Notice of Reasons for Rejection for JP Appl. No. 2023-564143, dated Nov. 27, 2024 (with English translation, 8 pages).

Notice of Reasons for Rejection for JP Appl. No. 2023-564143 date May 7, 2025 (with English translation, 5 pages).

Huawei et al., “Correction on relationship between UL antenna port and transmission layer in 38.211” 3GPP TSG-RAN WG1 Ad Hoc Meeting, R1-1801035, Jan. 26, 2018, Vancouver, Canada (6 pages).

International Search Report and Written Opinion for PCT Appl. No. PCT/CN2021/118117, mailed Jun. 2, 2022 (8 pages).

Apple Inc., “On Further MIMO Enhancement”, 3GPP TSG-RAN WG1 Meeting #106-e, R1-2107725, Aug. 27, 2021, e-Meeting (5 pages).

CATT, “On UL enhancements in Rel-18”, 3GPP TSG RAN Meeting #93-e, RP-212257, Sep. 17, 2021, Electronic Meeting (4 pages).

Futurewei, “Enhancements on SRS flexibility, coverage and capacity”, 3GPP TSG RAN WG1 Meeting #104-e, R1-2100042, Feb. 5, 2021, e-Meeting (25 pages).

Ran Vice-Chair (Deutsche Telekom), “Email discussion summary for [RAN-R18-WS-eMBB-Overall]”, 3GPP TSG RAN Rel-18 workshop, RWS-210654, Jul. 2, 2021, Electronic Meeting (98 pages).

Korean Notice of Final Rejection Appl. No. 10-2023-7035881 on KR dated Jul. 11, 2025 (6 pages).

Final Rejection for KR Appl. No. 10-2023-7035881, dated Nov. 26, 2025 (with English translation, 6 pages).

Office Action for MX Appl. No. MX/a/2023/012504, dated Nov. 25, 2025 (with English translation 8 pages).

* cited by examiner

Beam-based uplink (UL) and/or downlink (DL) transmission. The full line(s) indicate a Tx/Rx beam selected for transmission.

400

| TPMI index | *W* (ordered from left to right in increasing order of TPMI index) | | | | | | | |
|---|---|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}1\\0\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | - | - |

Precoding matrix *W* for single-layer transmissions using two antenna ports

| TPMI index | *W* (ordered from left to right in increasing order of TPMI index) | | | |
|---|---|---|---|---|
| 0-2 | $\frac{1}{\sqrt{2}}\begin{bmatrix}1 & 0\\0 & 1\end{bmatrix}$ | $\frac{1}{2}\begin{bmatrix}1 & 1\\1 & -1\end{bmatrix}$ | $\frac{1}{2}\begin{bmatrix}1 & 1\\j & -j\end{bmatrix}$ | |

Precoding matrix *W* for two-layer transmissions using two antenna ports

FIG. 5

600
2Tx:
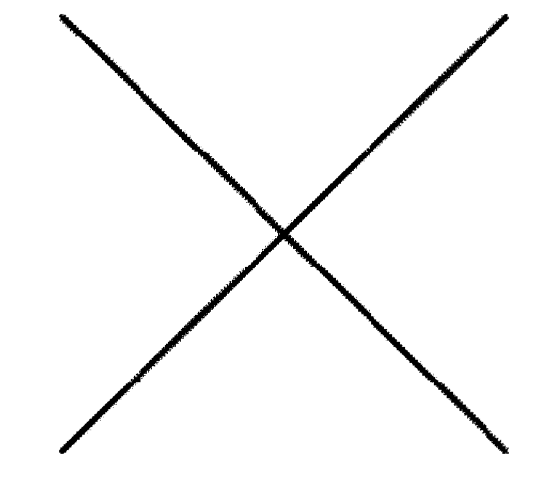
(a) Non-coherent
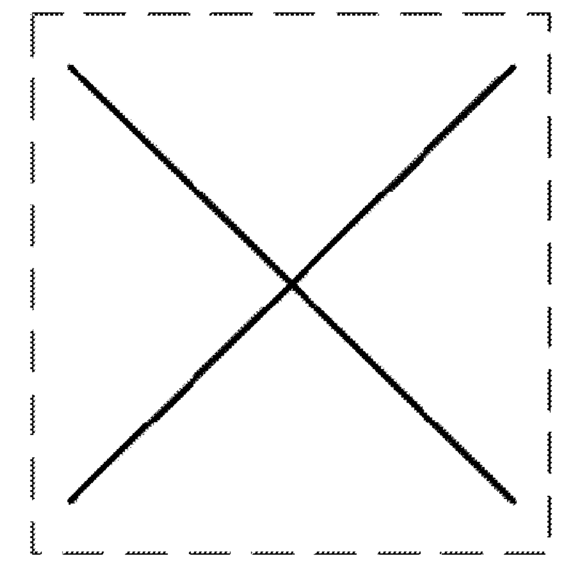
(b) Coherent
Antenna architecture for 2-Tx-antenna wireless communication device
FIG. 6

Antenna architecture for 4-Tx-antenna wireless communication device

Antenna architecture for 6-Tx-antenna wireless communication device

Antenna architecture for a 8-Tx antenna wireless communication device

1000

Antenna architecture for 8-Tx-antenna wireless communication device (N1, N2) = (4, 1)

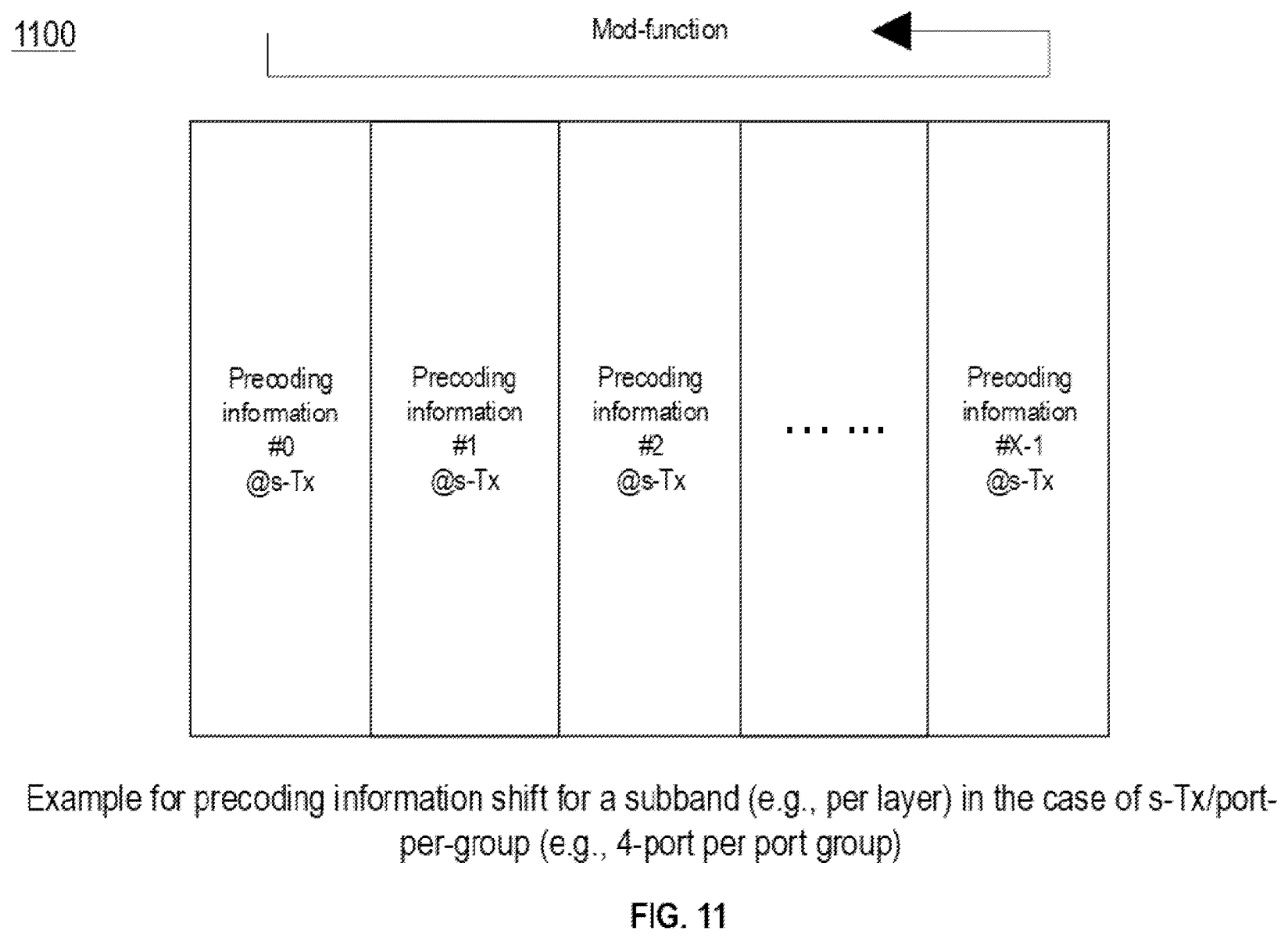

1100

Mod-function

Precoding information #0 @s-Tx

Precoding information #1 @s-Tx

Precoding information #2 @s-Tx

......

Precoding information #X-1 @s-Tx

Example for precoding information shift for a subband (e.g., per layer) in the case of s-Tx/port-per-group (e.g., 4-port per port group)

FIG. 11

SYSTEMS AND METHODS FOR UPLINK FREQUENCY SELECTIVE PRECODING

CROSS-REFERENCE TO RELATED APPLICATION

This application claims the benefit of priority under 35 U.S.C. § 120 as a continuation of International Patent Application No. PCT/CN2021/118117, filed on Sep. 14, 2021, the disclosure of which is incorporated herein by reference in its entirety.

TECHNICAL FIELD

The disclosure relates generally to wireless communications, including but not limited to systems and methods for selectively precoding an uplink (UL) frequency.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive a first signaling from the wireless communication node. The first signaling may include a plurality of precoding information associated with a plurality of port groups. The wireless communication device may determine signals precoded according to the plurality of precoding information. The wireless communication device may transmit the signals to the wireless communication node.

In some embodiments, the first signaling, or a second signaling received by the wireless communication device, may include mapping information associating each of the plurality of precoding information with a corresponding one of the plurality of port groups. In certain embodiments, each of the plurality of precoding information can be associated with a corresponding one of the plurality of port groups, according to an order. In some embodiments, the first signaling may include a first flag, a codepoint in a field of downlink control information (DCI), first bit value in a bitmap, or first matrix element value, indicative of whether a first port group of the plurality of port groups is enabled or disabled, or whether a first of the plurality of precoding information that corresponds to a first port group of the plurality of port groups is a matrix with all elements of zero. In certain embodiments, when the first port group of the plurality of port groups is disabled, the precoding information corresponding to the first port group may be precluded from the determining of the signals. In some embodiments, the wireless communication device may send, to the wireless communication node, capability reporting of the wireless communication device, which includes information comprising at least one of: the number of port groups, the number of ports per port group, the number of horizontal antenna elements on one polarization, the number of vertical antenna elements on one polarization, information related to distance between two antenna elements or two port groups, coherent type, number of antenna ports for a port group, combination of one or more port groups, number of ranks, number of ranks for a port group, combination of ranks, granularity of precoding information, number of precoding information, number of subbands, size of a subband, or codebook type.

In certain embodiments, the signals may comprise at least one of: a physical uplink shared channel (PUSCH), a physical uplink control channel (PUCCH), or a demodulation reference signal (DMRS). In some embodiments, the wireless communication device may receive a configuration including at least one of: coherent type, number of antenna ports, number of port groups, number of antenna ports for a port group, combination of one or more port groups, number of ranks, number of ranks for a port group, combination of ranks, granularity of precoding information, number of precoding information, number of subbands, size of a subband, or codebook type. In certain embodiments, the wireless communication device may receive a configuration of a plurality of transmission modes, each transmission mode including at least one of: coherent type, number of antenna ports, number of port groups, number of antenna ports for a port group, combination of one or more port groups, number of ranks, number of ranks for a port group, combination of ranks, granularity of precoding information, number of precoding information, number of subbands, size of a subband, or codebook type. In some embodiments, the wireless communication device may receive a selection of one of the plurality of transmission modes from the wireless communication node. In some embodiments, the combination of one or more port groups may comprise at least one of: {1 antenna port, 1 antenna ports}, {2 antenna ports}, {1 antenna port, 1 antenna ports, 1 antenna port, 1 antenna port}, {2 antenna ports, 2 antenna ports}, {4 antenna ports}, {1 antenna port, 1 antenna ports, 1 antenna port, 1 antenna port, 1 antenna ports, 1 antenna port}, {2 antenna ports, 2 antenna ports, 2 antenna ports}, {4 antenna ports, 2 antenna ports}, {3 antenna ports, 3 antenna ports}, {6 antenna ports}, {1 antenna port, 1 antenna ports, 1 antenna port, 1 antenna port, 1 antenna ports, 1 antenna port, 1 antenna ports, 1 antenna port}, {2 antenna ports, 2 antenna ports, 2 antenna ports, 2 antenna ports}, {2 antenna ports, 2 antenna ports, 4 antenna ports}, {6 antenna ports, 2 antenna ports}, {4 antenna ports, 4 antenna ports} or {8 antenna ports}.

In certain embodiments, the first signaling may comprise co-phase information corresponding to one or more of the plurality of port groups. In some embodiments, when at least one of the plurality of port groups is full coherent, a distance between two port groups may be a non-restricted value or is K*λ, where λ, denotes a wave-length, and K is a defined value or a value reported in a capability signaling. In certain embodiments, the wireless communication device may transmit, via N antenna ports, the signals precoded according to the precoding information, wherein N is equal to 1, 2, 4, 6 or 8. When N is 2, the N antenna ports may be formed from a combination of port groups of {1 antenna port, 1 antenna ports} or {2 antenna ports}. When N is 4, the N antenna ports may be formed from a combination of port groups of {1 antenna port, 1 antenna ports, 1 antenna port, 1 antenna port}, {2 antenna ports, 2 antenna ports} or {4 antenna ports}. When N is 6, the N antenna ports can be formed from a combination of port groups of {1 antenna port, 1 antenna ports, 1 antenna port, 1 antenna port, 1 antenna ports, 1 antenna port}, {2 antenna ports, 2 antenna ports, 2 antenna ports}, {4 antenna ports, 2 antenna ports}, {3 antenna ports, 3 antenna ports} or {6 antenna ports}. When N is 8, the N antenna ports may be formed from a combination of ports groups of {1 antenna port, 1 antenna ports, 1 antenna port, 1 antenna port, 1 antenna ports, 1 antenna port, 1 antenna ports, 1 antenna port}, {2 antenna ports, 2 antenna ports, 2 antenna ports, 2 antenna ports}, {2 antenna ports, 2 antenna ports, 4 antenna ports}, {6 antenna ports, 2 antenna ports}, {4 antenna ports, 4 antenna ports} or {8 antenna ports}.

In some embodiments, when N is 8, the N antenna ports can be in a (N1, N2) configuration which is a (1,4), (2, 2) or (4, 1) configuration, where N1 indicates a number of horizontal antenna elements on one polarization, and N2 indicates a number of vertical antenna elements on one polarization. In certain embodiments, a rank may be same across all subbands or resources corresponding to the signals. In some embodiments, the rank and precoding information of each of the port groups may be jointly encoded in a field of the second signaling. In certain embodiments, a maximum value of rank may be configured per port group or per bandwidth part (BWP). In some embodiments, one or more of the port groups may be associated with a corresponding uplink codeword. In some embodiments, the plurality of precoding information may comprise a differential transmit precoding matrix index (TPMI) per layer or subband. In certain embodiments, the wireless communication device may determine first precoding information for a first subband using a Mod function. In some embodiments, the Mod function can be performed per layer. In certain embodiments, the wireless communication device may receive a second signaling from the wireless communication node. The second signaling may comprise a plurality of parameter configurations for some or all subbands. The wireless communication device may receive the first signaling or a third signaling from the wireless communication node. The third signaling may indicate a first parameter configurations of the plurality of parameter configurations.

In some embodiments, each of the plurality of precoding information may comprise at least one of: precoding group indication, precoding indication, or co-phase indication. In certain embodiments, the precoding indication can be for all subbands or the signals, and the co-phase indication may be for a corresponding one of the subbands. The precoding group indication may be for all subbands or the signals, and the precoding indication from an indicated precoding group, and the co-phase indication are for a corresponding one of the subbands. The precoding group indication and the precoding indication from the indicated precoding group can be for all subbands or the signals, and the co-phase indication may be for a corresponding one of the subbands. In certain embodiments, a precoding matrix can be common to any polarization or layer of any of the port groups, and co-phase may be specific to each polarization or layer. In some embodiments, a precoding matrix may be specific to a corresponding port group, and a co-phase can be specific to a polarization or layer of the corresponding port group. In certain embodiments, a co-phase for one of the port groups may be indicated per subband. In some embodiments, a co-efficient between two of the port groups may be 0 or indicated per subband. In certain embodiments, one of the plurality of precoding information may correspond to a subband. In some embodiments, the wireless communication device may receive the first signaling or a second signaling from the wireless communication node. The second signaling may include at least one of: a single modulation and coding scheme (MCS) per codeword or transmission block, a rank indicator (RI) or number of layers per port group, a field that provides a RI and precoding information for a first subband, wherein the RI applied to all other subbands, or fields that provide precoding information and a same RI for all other subbands, a number of precoding information, a number of subbands, a size of a subband, or a granularity of precoding information. In certain embodiments, at least one of size of: a subband or a granularity of precoding information, can be determined according to a configuration parameter related to: the granularity of precoding information, a number of resource blocks (RBs) corresponding to the signals, index of a starting RB corresponding to the signals, a number of subbands, a subcarrier spacing (SCS), a total number of resource blocks for a component carrier (CC) or a bandwidth part (BWP), index of a starting RB corresponding to the CC or the BWP, a total number of SRS resources, or a number of SRS ports or antenna ports.

In some embodiments, a Mod function may be performed for determining a size of first or last subband of the signals. In certain embodiments, a floor function can be performed for determining a size of each subband of the signals. In certain embodiments, a number of subcarrier spacing (SRS) ports or antenna ports may be greater than or equal to a first threshold. In some embodiments, a number of resource blocks (RBs) for a transmission or a bandwidth part (BWP) or component carrier (CC) carrying the transmission may be greater than or equal to a second threshold. In certain embodiments, a rank or number of layers for the transmission can be greater than or equal to a third threshold. In some embodiments, at least one candidate value of: a granularity of precoding information, a number of precoding information, a number of subbands, or a size of a subband, may be reported as user equipment (UE) capability. In certain embodiments, the wireless communication device may receive a second signaling from the wireless communication node. The second signaling may comprise one or more granularities of precoding information. The wireless communication device may receive a third signaling from the wireless communication node. The third signaling may indicate a first granularity of one or more granularities. In some embodiments, the wireless communication device may receive a second signaling from the wireless communication node. The second signaling may include at least one of: a modulation and coding scheme (MCS), a rank indicator (RI) or precoding information for all subbands or the signals. The wireless communication device may receive the first signaling or a third signaling from the wireless communication node. The third signaling may comprise precoding information for a first subband.

In some embodiments, at least two of the first signaling, the second signaling or the third signaling may have a same hybrid automatic request (HARQ) process number. In certain embodiments, a search space of the second signaling can be associated with a search space of the first signaling or the third signaling. In some embodiments, a HARQ process number field in the first signaling, the second signaling or the third signaling may be set to a specific value. In certain embodiments, a redundancy version field in the first signaling, the second signaling or the third signaling may be set to a specific value. In some embodiments, a modulation and coding scheme (MCS) field in the first signaling, the second signaling, or the third signaling may be set to a specific value. In certain embodiments, a frequency domain resource assignment field in the first signaling, the second signaling or the third signaling can be set to a specific value. In some embodiments, an uplink or downlink shared channel indicator field in the first signaling, the second signaling or the third signaling may be set to a specific value.

At least one aspect is directed to a system, method, apparatus, or a computer-readable medium. A wireless communication node (e.g., a ground terminal, a base station, a gNB, an eNB, or a serving node) may transmit a first signaling to a wireless communication device. The first signaling may include a plurality of precoding information associated with a plurality of port groups. The wireless communication node may receive signals precoded by the wireless communication device from the wireless communication device. The signals can be precoded by the wireless communication device according to the plurality of precoding information.

In this disclosure, an uplink frequency selective precoding approach for enabling efficient uplink (UL) transmissions is described. Specifically, the systems and methods presented herein consider one or more types of antenna architectures of a wireless communication device (e.g., UE), considering the mixed cases of 2Tx/4Tx/6Tx/8Tx, non-coherent/partial-coherent/full-coherent, and/or uniform-space/random-distributed architectures. A port group-based solution is described herein, in order to provide a unified solution for the above described architectures (which is essential for standardization and/or real-field deployment). Furthermore, a flexible signaling design for frequency selective precoding is discussed, wherein said signaling design can balance an UL transmission performance and/or a DCI overhead.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIGS. 4-5 illustrate example precoding matrices W for single-layer and/or two-layer transmissions, in accordance with some embodiments of the present disclosure;

FIGS. 6-10 illustrate example configurations of antenna architectures for wireless communication devices, in accordance with some embodiments of the present disclosure;

FIG. 11 illustrates example approaches for precoding information shift for a subband, in accordance with some embodiments of the present disclosure.

DETAILED DESCRIPTION

1. Mobile Communication Technology and Environment

Figure 1:
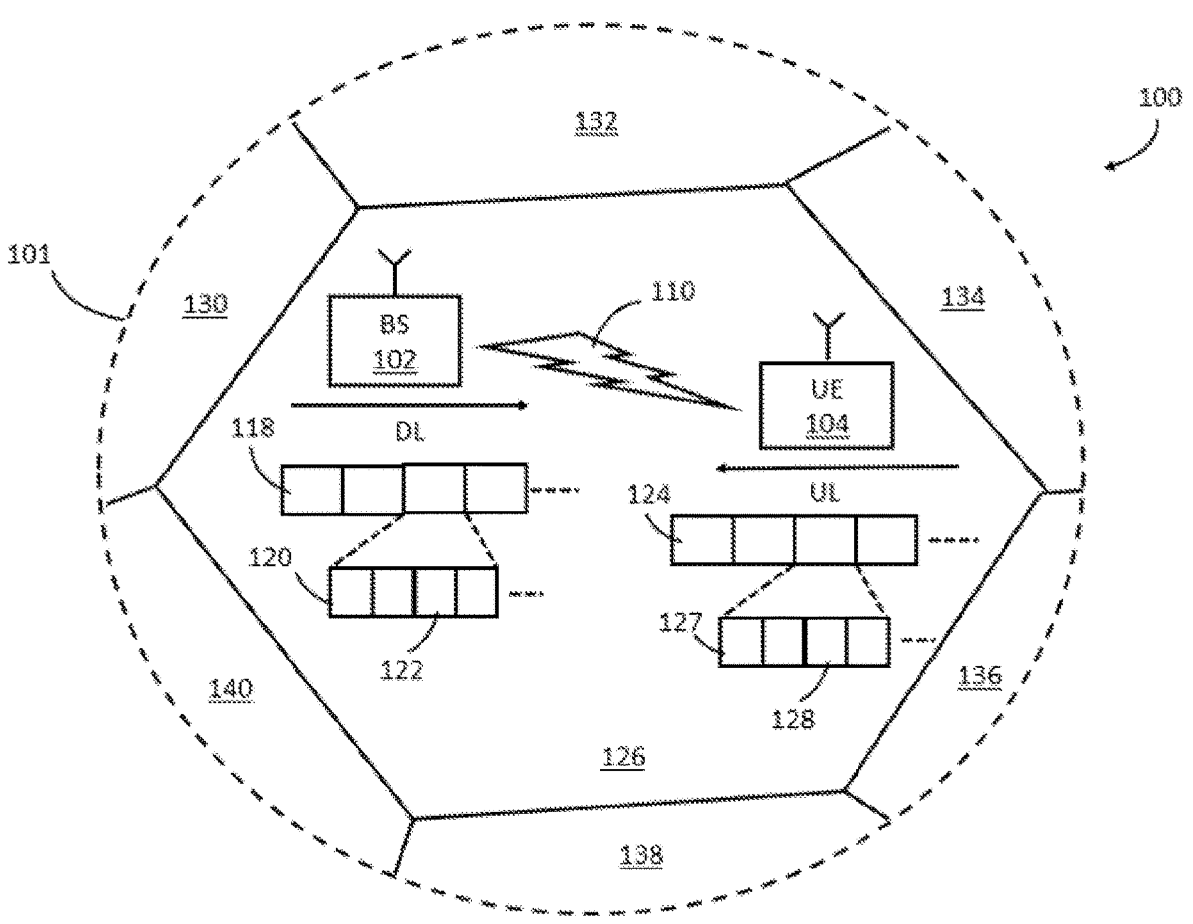
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
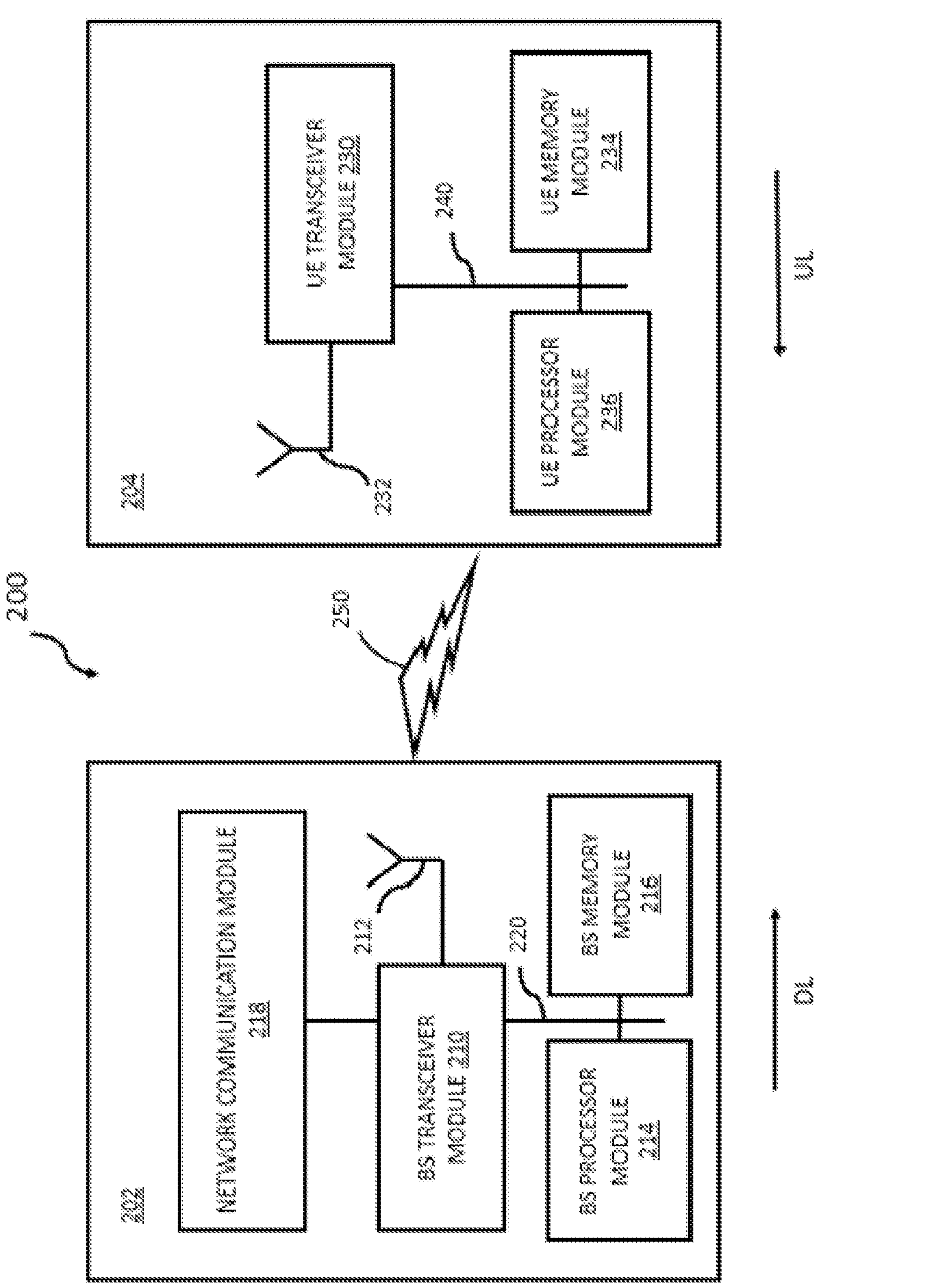
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station)

transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an “uplink” transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a “downlink” transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms “configured for,” “configured to” and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Uplink Frequency Selective Precoding

In certain systems (e.g., 5G new radio (NR), Next Generation (NG) systems, 3GPP systems, and/or other systems), a transmission (e.g., an uplink (UL) multiple input multiple output (MIMO) transmission) can use (e.g., be based on) wideband transmission precoding information (e.g., a single transmission precoding matrix indicator (TPMI) applied to an UL transmission bandwidth) to save/reduce an overhead associated with downlink control information (DCI) signalling. In certain embodiments, a maximum number of transmit (Tx) antennas of a wireless communication device (e.g., a UE, a terminal, or a served node) may include or correspond to four Tx antennas (or other numbers of antennas). However, a degradation in an UL performance of the wireless communication device (e.g., due to the wideband precoding) cannot be ignored, particularly in scenarios with wideband UL transmissions that use a plurality of Tx antennas (e.g., four or more antennas). Performing wideband UL transmissions using a plurality of Tx antennas can be an emerging performance enhancement in some systems (e.g., 5G-Advanced, 6G systems, NG systems, and/or other systems), wherein performing said wideband UL transmissions can increase a throughput and/or robustness of said system(s).

As such, frequency selective precoding for UL-MIMO transmissions (e.g., for 4, 6 and/or 8 UE Tx antennas) can be considered in systems that perform wideband UL transmissions using a plurality of Tx antennas. Frequency selective precoding techniques for UL-MIMO transmissions can enhance and/or improve an UL precoding from wideband to subband, Certain frequency selective precoding techniques (e.g., for UL-MIMO transmissions) may face/address one or more of the following issues/challenges:

1) In order to provide an efficient frequency selective precoding, an antenna architecture of the wireless communication device can be considered (e.g., taken into consideration). The antenna architecture of the wireless communication device can impact/influence the UL precoding codebook design. As such, frequency selective precoding techniques may consider (e.g., take into consideration) a plurality of antenna architectures, such as mixed cases of 2Tx/4Tx/6Tx/8Tx architectures, non-coherent/partial-coherent/full-coherent architectures, and/or uniform-space/random-distributed architectures.
2) The UL precoding codebook may enable the above-mentioned mixed cases (e.g., for UL codebook physical uplink shared channel (PUSCHO transmissions). A unified solution can be considered, for instance, in order to avoid several independent, separate, and/or distinct solutions for different cases. As such, the systems and methods described herein present and/or discuss a port group-based solution that provides a unified solution.
3) High-efficient frequency-specific precoding mechanisms can be used to increase a tolerance to DCI signaling overhead. Certain systems/methods can include/use a wideband (WB)-specific parameter and/or a subband (SB)-specific parameter (e.g., for a modulation and coding scheme (MCS), rank indicator (RI), and TPMI). In some embodiments, a flexible indication signaling (e.g., a plurality of levels) may be used, and/or a granularity of the frequency-selective precoding can be considered.

Figure 3:
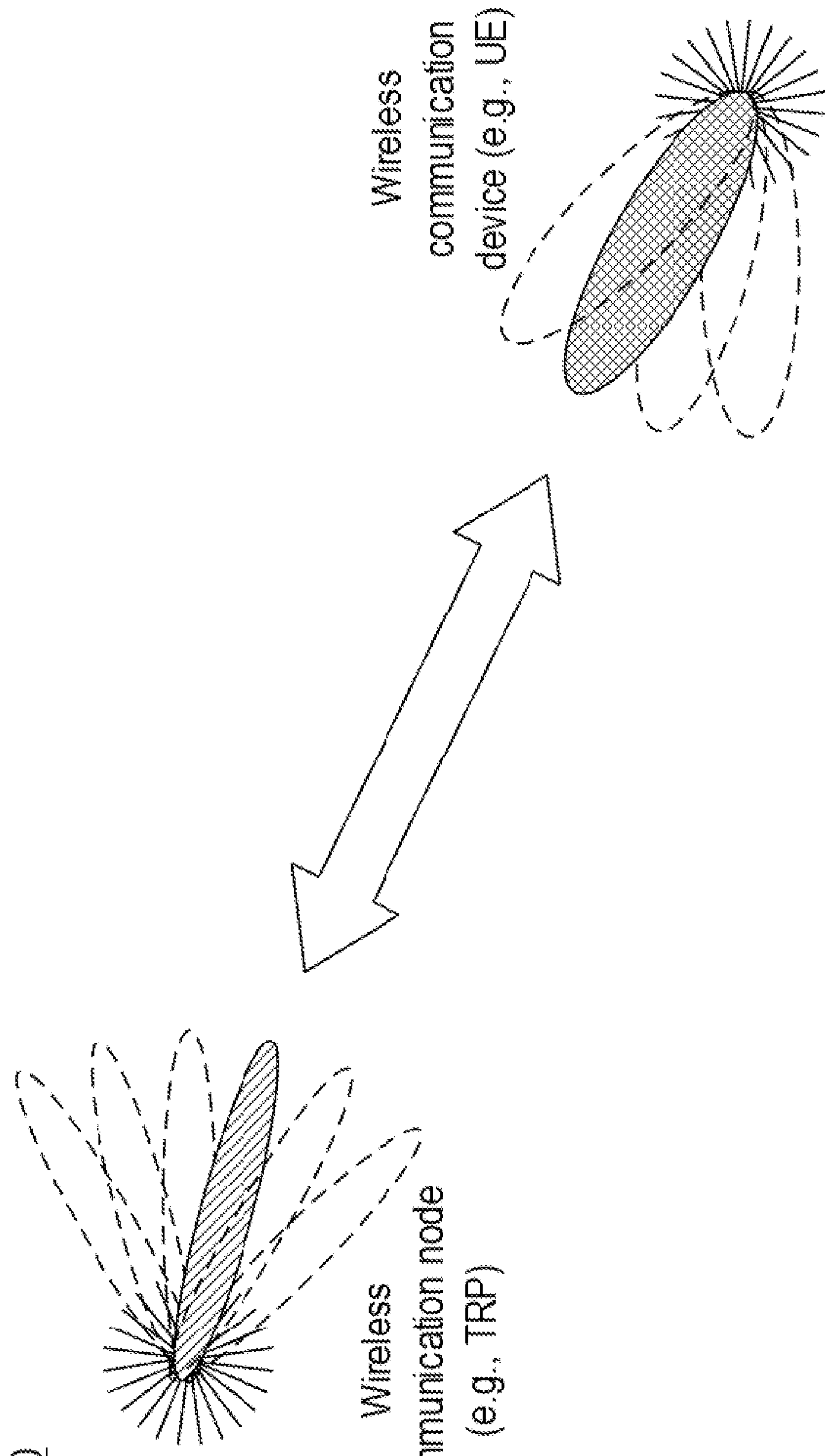
FIG. 3 illustrates example approaches for beam based uplink (UL) and/or downlink (DL) transmissions, in accordance with some embodiments of the present disclosure.

In certain systems, the use of high frequency resources may induce/produce/cause a considerable propagation loss. Therefore, wide and/or ultra-wide spectrum resources may pose/introduce/cause noticeable challenges (e.g., due to propagation loss). Referring now to FIG. 3, depicted is an example approach 300 for beam based UL and/or DL transmissions. One or more beams of FIG. 3 may indicate/specify/represent a selected/identified transmit (Tx) beam and/or receive (Rx) beam for transmissions. In some embodiments, certain technologies/techniques may achieve/cause beam alignment and/or obtain/cause sufficient antenna gain. For example, antenna arrays and/or beam-forming training techniques that use massive multiple-input multiple-output (MIMO) (e.g., up to 1024 antenna elements for one node) may achieve beam alignment and/or sufficient antenna gain. In some embodiments, analog phase shifters may be used to implement/enable mmWave beam-forming (BF). Using analog phase shifters may result in a low cost of implementation with the benefits of using antenna arrays. If analog phase shifters are used (e.g., to implement mmWave beam-forming), the number of controllable phases may be finite/defined/restricted. In some embodiments, the use of analog phase shifters may place/cause one or more constant modulus constraints on the analog phase shifters. Given a set of one or more pre-specified beam patterns, the goal/target of variable-phase-shift-based beamforming (BF) training may correspond to identifying/determining the optimum beam pattern for subsequent data transmissions. The identified beam pattern may apply to one or more scenarios with one transmit receive point (TRP) and/or one panel (e.g., a UE with one panel).

For certain physical uplink shared channel (PUSCH) transmissions, a block of vectors $$\left[y^{(0)}(i)\ \ldots\ y^{(\upsilon-1)}(i)\right]^T,\ i=0,1,\ldots,M_{symb}^{layer}-1$$

can be precoded according to:

$$\begin{bmatrix} z^{(P_0)}(i) \\ \vdots \\ z^{(P_{p-1})}(i) \end{bmatrix} = W \begin{bmatrix} y^{(0)}(i) \\ \vdots \\ y^{(\upsilon-1)}(i) \end{bmatrix}.$$

A set of antenna ports (e.g., $\{P_0\ .\ .\ .\ ,\ P_{p-1}\}$) may be determined according to (or based on) one or more sounding reference signal (SRS) ports of one or more SRS resources. The one or more SRS resources may be associated with (or related to) a PUSCH transmission. A wireless communication device may transmit, send, broadcast, and/or communicate the PUSCH transmission using the same/corresponding antenna ports as the SRS port(s) of the SRS resource(s) associated with the PUSCH transmission. A DCI configuration and/or radio resource control (RRC) configuration (or other configurations) can provide, specify, and/or indicate said association (e.g., SRS resources associated with the PUSCH transmission).

- For non-codebook-based transmissions, a precoding matrix W may include or correspond to an identity matrix.
- For codebook-based transmissions, the precoding matrix W may include or correspond to W=1 for single-layer transmissions on a single antenna port. In certain embodiments, the precoding matrix W may include or correspond to a TPMI. The TPMI can be obtained/acquired from the DCI scheduling the uplink transmission.
  - The precoding matrix W can be wideband in 5G NR (or other systems). As such, for a given UL transmission, the same precoding (e.g., a single W) may be used for each resource element (RE), regardless of a number of resource blocks (RB) or REs.
  - The systems and methods of the present disclosure may focus on (or relate to) codebook-based transmissions.

For instance, in a wireless communication device with 2 Tx antenna-ports (e.g., 2 Tx antenna-port), the precoding matrix W for single-layer and/or two-layer transmissions can be found in table 400 of FIG. 4 and table 500 of FIG. 5, respectively.

In some embodiments, a beam state may correspond/refer to a quasi co-location (QCL) state, a transmission configuration indicator (TCI) state, a spatial relation state (or spatial relation information state), a reference signal (RS), a spatial filter, and/or pre-coding. In some embodiments, beam state may correspond to a beam. Specifically:

a) A Tx beam may correspond/refer to a QCL state, a TCI state, a spatial relation state, a DL/UL reference signal (e.g., a channel state information RS (CSI-RS), a synchronization signal block (SSB) or SS/PBCH, a demodulation reference signal (DMRS), a sounding reference signal (SRS), a physical random access channel (PRACH), and/or other signals), a Tx spatial filter, and/or Tx precoding.

b) A Rx beam may correspond/refer to a QCL state, a TCI sate, a spatial relation state, a spatial filter, a Rx spatial filter, and/or Rx precoding.

c) A beam identifier (ID) may correspond/refer to a QCL state index, a TCI state index, a spatial relation state index, a reference signal index, a spatial filter index, a precoding index, and/or other indices.

In some embodiments, the spatial filter may correspond to the perspective of the wireless communication device and/or the wireless communication node. In some embodiments, the spatial filter may refer to a spatial-domain filter and/or other filters.

In some embodiments, a spatial relation information may comprise one or more reference RSs. The spatial relation information may be used to specify/indicate/convey/represent a same and/or quasi-co spatial relation between a targeted RS/channel and the one or more reference RSs. In some embodiments, a spatial relation may refer to a beam, a spatial parameter, and/or a spatial domain filter.

In some embodiments, a QCL state may comprise one or more reference RSs and/or one or more corresponding QCL type parameters. The QCL type parameters may include at least one of a Doppler spread, a Doppler shift, a delay spread, an average delay, an average gain, and/or a spatial parameter. In some embodiments, a TCI state may correspond/refer to a QCL state. In some embodiments, a QCL Type D may correspond to a spatial parameter and/or a spatial Rx parameter. In some embodiments, a signal may include/comprise a physical uplink control channel (PUCCH), a physical uplink shared channel (PUSCH), a demodulation reference signal (DMRS), a sounding reference signal (SRS), and/or other channels/signals. In certain embodiments, precoding may correspond to a precoding matrix, precoding vector, and/or precoding codebook. In some embodiments, all subbands may correspond to a wideband or the transmission of a signal (e.g., an entire transmission of corresponding signal, or the corresponding signal transmission). In some embodiments, a parameter (e.g., a precoding, a co-phase, and/or a transmission parameter) for all subbands may correspond to the parameter for a wideband, and/or the parameter applied to a signal (e.g., the entire transmission of a signal, and/or all resources corresponding to the signal transmission).

In some embodiments, a time unit may include a sub-symbol, a symbol, a slot, a sub frame, a frame, a transmission occasion, and/or other time instances. In some embodiments, a power control parameter may include a target power (P0), a path loss RS (e.g., a coupling loss RS), a scaling factor for path loss (e.g., alpha), and/or a closed loop process. In some embodiments, the DCI may correspond/refer to a PDCCH. In certain embodiments, precoding information may include or correspond to a precoding matrix indicator (PMI), a transmission precoding matrix indicator (TPMI), precoding information, and/or beam information. In some embodiments, a port group may include or specify an antenna group and/or a port group of a wireless communication device (e.g., UE port group).

A. Embodiment 1: Architecture of a Wireless Communication Device for up to 8 Tx Antennas In some embodiments, for UL transmissions, a wireless communication node (e.g., gNB) may indicate and/or specify a precoding information to the wireless communication device (e.g., for determining the UL Tx precoding). As such, from the perspective of the wireless communication device, the wireless communication node can indicate the precoding information (e.g., W) to the wireless communication device by using (or according to) a command/signaling (e.g., a RRC command/signaling, a medium access control control element (MAC-CE) command/signaling, and/or a DCI command/signaling). Based on the precoding information, the block of vectors $$\left[y^{(0)}(i)\ \ldots\ y^{(\upsilon-1)}(i)\right]^T,\ i=0,1,\ldots,M_{symb}^{layer}-1$$

may be precoded according to the following formula:

$$\begin{bmatrix} z^{(P_0)}(i) \\ \vdots \\ z^{(P_{p-1})}(i) \end{bmatrix} = W \begin{bmatrix} y^{(0)}(i) \\ \vdots \\ y^{(\upsilon-1)}(i) \end{bmatrix}.$$

The precoded signals (e.g., refer to the UL data channel) can be transmitted by a corresponding antenna port ($P_0$ to $P_{p-1}$). A number of antenna ports (e.g., UE Tx antenna ports) can be specified and/or indicated by ρ.

For an UL codebook (e.g., one or more candidate matrices corresponding to W), an antenna architecture of the wireless communication device (e.g., a typical UE antenna architecture) may be identified/determined. In one or more figures described herein (e.g., FIGS. 6-10), a box (e.g., a box with dashed lines or a solid line) may indicate the one or more Tx antennas within said box are coherent (e.g., each antenna pair is either on or off).

Figure 7:
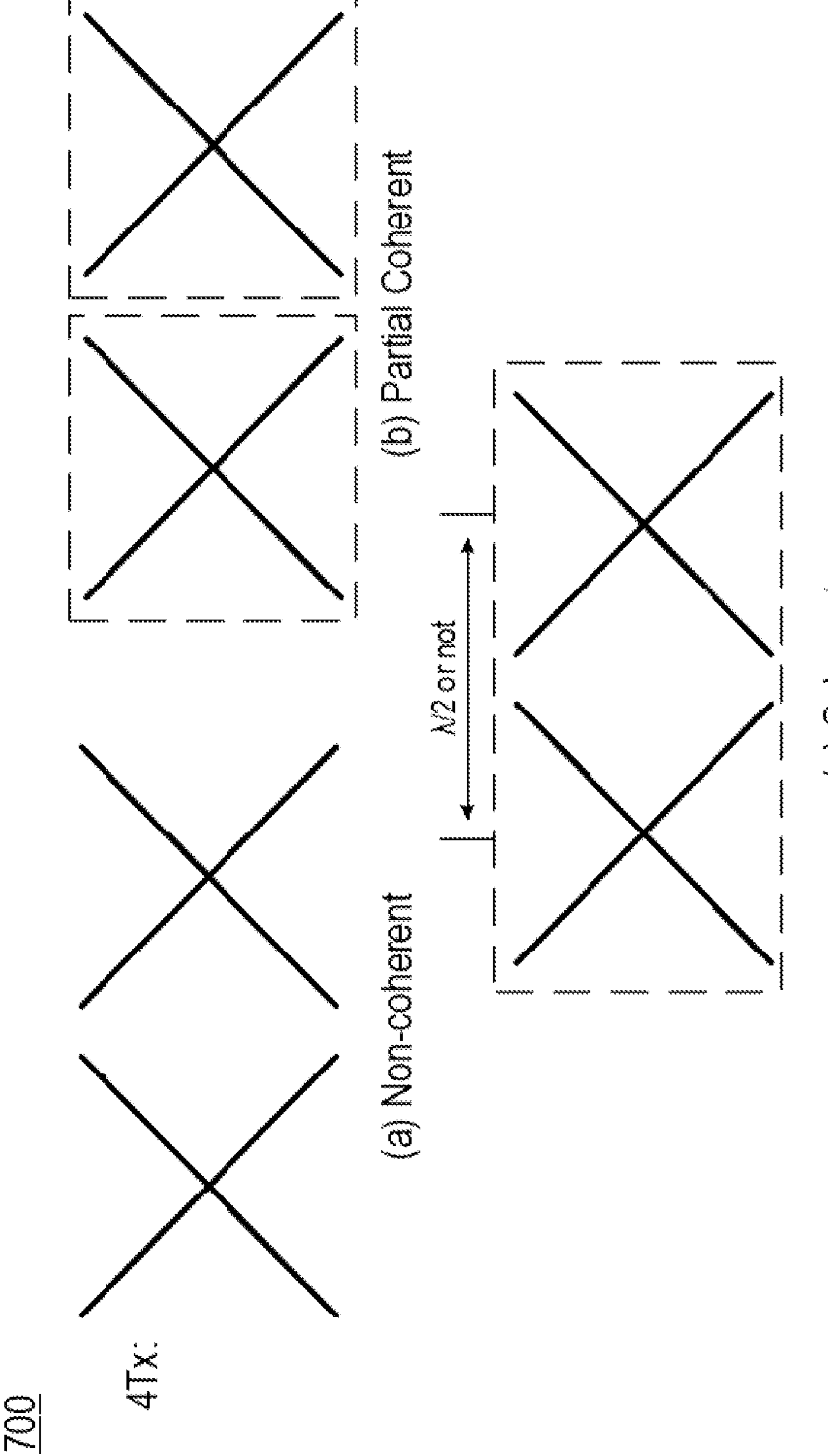
Figure 8:
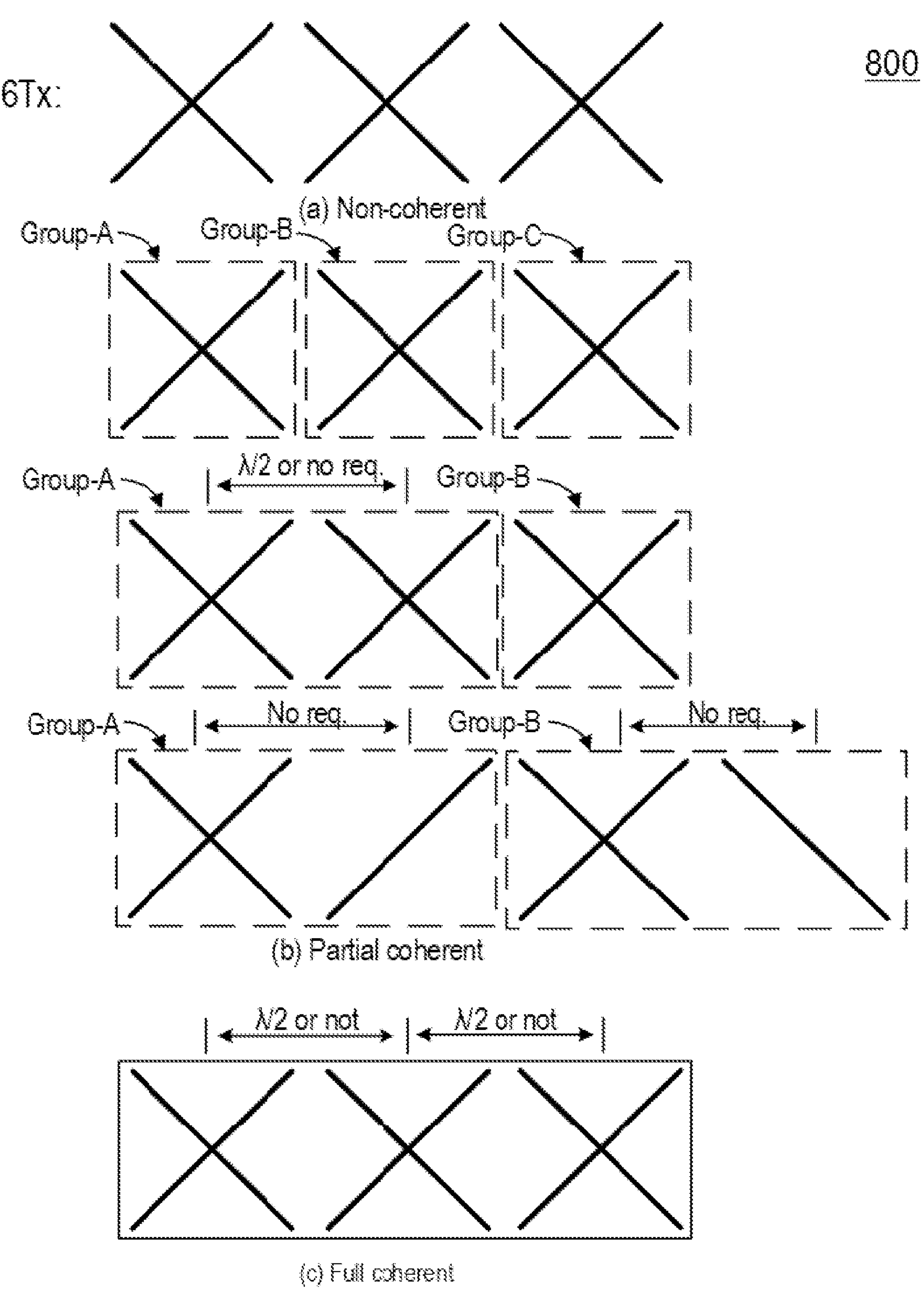

- A wireless communication device with 2 Tx antennas (e.g., 2Tx antenna UE) may have at least two candidate architectures. As shown in FIG. 6, the at least two candidate architectures may include a non-coherent architecture and/or a full coherent architecture. In a full coherent wireless communication device, the two antenna elements may be cross-polarized (e.g., +45 degree, and −45 degree)
  - For a non-coherent wireless communication device, a co-phase between two non-coherent antenna elements can be meaningless, due to the fact that the wireless communication device may be unable to adequately control the co-phase between the two antenna elements (e.g., without appropriate antenna calibration).
  - In certain embodiments, the co-phase between two coherent antenna elements can be adequately controlled by the wireless communication device. As such, the precoding across the two coherent antenna elements can be used for achieving an expected beam-forming to improve the performance of the wireless communication device (e.g., a higher spatial diversity and/or multiplexing)
  - From the perspective of the UL codebook, a co-efficient for non-coherent port(s) may be provided to achieve/enable port selection (e.g., via '0' or '1', such as TPMI=0, 1 in table 400).
- A wireless communication device with 4 Tx antennas (e.g., 4Tx antenna UE) may have at least three candidate architectures. As shown in FIG. 7, the at least three candidate architectures may include a non-coherent architecture, a partial coherent architecture, and/or a full coherent architecture. Compared to a wireless communication device with 2 Tx antennas, the partial coherent architecture can be further considered. For example, certain implementations may include a plurality of port groups, wherein the ports are coherent within each port group. However, ports from different/separate/distinct port groups may not be coherent.
  - Within a coherent port group, for example, the precoding information may be layer-common (e.g., a same value for different polarization). The co-phase can be provided separately for each polarization and/or port group.
  - For a full coherent implementation, a distance between two groups of cross polarization may include or correspond to K*λ (and/or other values). In some embodiments, λ can indicate and/or specify a wavelength.
    - In one example, K=0.5 (e.g., the distance is λ/2). As such, a typical uniformly spaced distribution can be described. Therefore, a typical discrete Fourier transform (DFT) codebook can be used.
    - In some embodiments, a distance between two groups may be random (and/or correspond to other values). As such, a random distance between two groups may correspond to a distributed antenna architecture (e.g., heterogeneous UE and/or UE aggregation). In such case, independent co-phase information may be provided per group.
- A wireless communication device with 6Tx antennas (e.g., 6Tx antenna UE) may have at least three candidate architectures. As shown in FIG. 8, the at least three candidate architectures may include a non-coherent architecture, a partial coherent architecture, and/or a full coherent architecture. Compared to a wireless communication device with 4 Tx antennas, at least three additional scenarios of the partial coherent architecture can be further considered (e.g., 2+2+2, 4+2, and 3+3, for 6Tx antenna UE).
  - For a non-coherent wireless communication device, if the number of layers does not exceed 4 layers, a port selection can be used, and/or a portion of antenna ports may be powered off. As such, supporting a partial coherent and/or coherent wireless communication device can guarantee a certain level of transmission performance of the wireless communication device.
  - In order to facilitate and/or enable a standardized/unified solution, a Tx port group of a wireless communication device (e.g., a UE TX port group) with coherent ports can be used. The precoding/codebook can be provided per port group of the wireless communication device.
    - The UL codebook can be dedicated to a particular port group of the wireless communication device.
    - A capability reporting of the wireless communication device and/or a configuration of the wireless communication node may determine a sharing of the same precoding information (e.g., port group common precoding information).
    - In some embodiments, a co-phase can be provided per port group. For example, a co-phase of a first group can be fixed/set/configured to 1. The wireless communication node may indicate and/or specify the co-phase of the other groups.

Further details and/or features can be found in the discussion of Embodiment #2.

For a partial coherent wireless communication device, a combination of {2, 2, 2}, {4, 2} and/or {3, 3} can be further considered.

For {2, 2, 2}, for each layer, 2 ports can be served with a co-phasing indication by default.

RANK-1 (e.g., wherein a rank can indicate a number of layers): 2-Tx out of {A, B, C} can be indicated for one layer.

RANK-2: {2-Tx-A, 2-Tx-B} can be used for a first and second layer, respectively.

RANK-3: {2-Tx-A, 2-Tx-B, 2-Tx-C} can be used for a first, second and third layer, respectively.

RANK-4: {2-Tx-A, 2-Tx-B, 2-Tx-C, 2-Tx-C} can be used for a first, second, third and fourth layer, respectively.

RANK-5: {2-Tx-A, 2-Tx-B, 2-Tx-B, 2-Tx-C, 2-Tx-C} can be used for a first, second, third, fourth and fifth layer, respectively.

RANK-6: {2-Tx-A, 2-Tx-A, 2-Tx-B, 2-Tx-B, 2-Tx-C, 2-Tx-C} can be used for a first, second, third, fourth, fifth and sixth layer, respectively.

For {3, 3}, distributed antennas with a random phase (e.g., among coherent antenna elements) can be considered as a typical example.

RANK-1: 3-Tx (e.g., 3 Tx antennas) can be used for the one layer.

RANK-2: {3-Tx-A, 3-Tx-B} can be used for the first and second layer, respectively.

RANK-3: {3-Tx-A 3-Tx-A; 3-Tx-B} can be used for the first, second and third layer, respectively.

RANK-4: {3-Tx-A 3-Tx-A; 3-Tx-B 3-Tx-B} can be used for the first, second, third and fourth layer, respectively.

RANK-5: {3-Tx-A 3-Tx-A 3-Tx-A; 3-Tx-B 3-Tx-B} can be used for the first, second, third, fourth and fifth layer, respectively.

RANK-6: {3-Tx-A 3-Tx-A 3-Tx-A; 3-Tx-B 3-Tx-B 3-Tx-B} can be used for the first, second, third, fourth, fifth and sixth layer, respectively.

For {4, 2}, distributed antennas with a random phase (e.g., among coherent antenna elements) may be considered as a starting/initial point.

RANK-1: 4-Tx-A/2-Tx-B can be used for the one layer.

RANK-2: {4-Tx-A, 2-Tx-B} or {4-Tx-A, 4-Tx-A} can be used for the first and second layer, respectively.

As such, one of the above-mentioned two candidates (e.g., {4-Tx-A, 2-Tx-B} or {4-Tx-A, 4-Tx-A}) can be indicated (e.g., {the number of port groups+TPMI per port group}).

In some embodiments, each TPMI may include a value of 'Null' or 'a reserved value' to close/shutdown/preclude a corresponding port group.

RANK-3: {4-Tx-A, 4-Tx-A, 2-Tx-B} can be used for the first, second and third layer, respectively.

RANK-4: {4-Tx-A, 4-Tx-A, 4-Tx-A, 2-Tx-B} or {4-Tx-A, 4-Tx-A, 2-Tx-B, 2-Tx-B} can be used for the first, second, third and fourth layer, respectively.

RANK-5: {4-Tx-A, 4-Tx-A, 4-Tx-A, 2-Tx-B, 2-Tx-B} can be used for the first, second, third, fourth and fifth layer, respectively.

RANK-6: {4-Tx-A, 4-Tx-A, 4-Tx-A, 4-Tx-A, 2-Tx-B, 2-Tx-B} to be used for the first, second, third, fourth, fifth and sixth layer, respectively.

Figure 9:
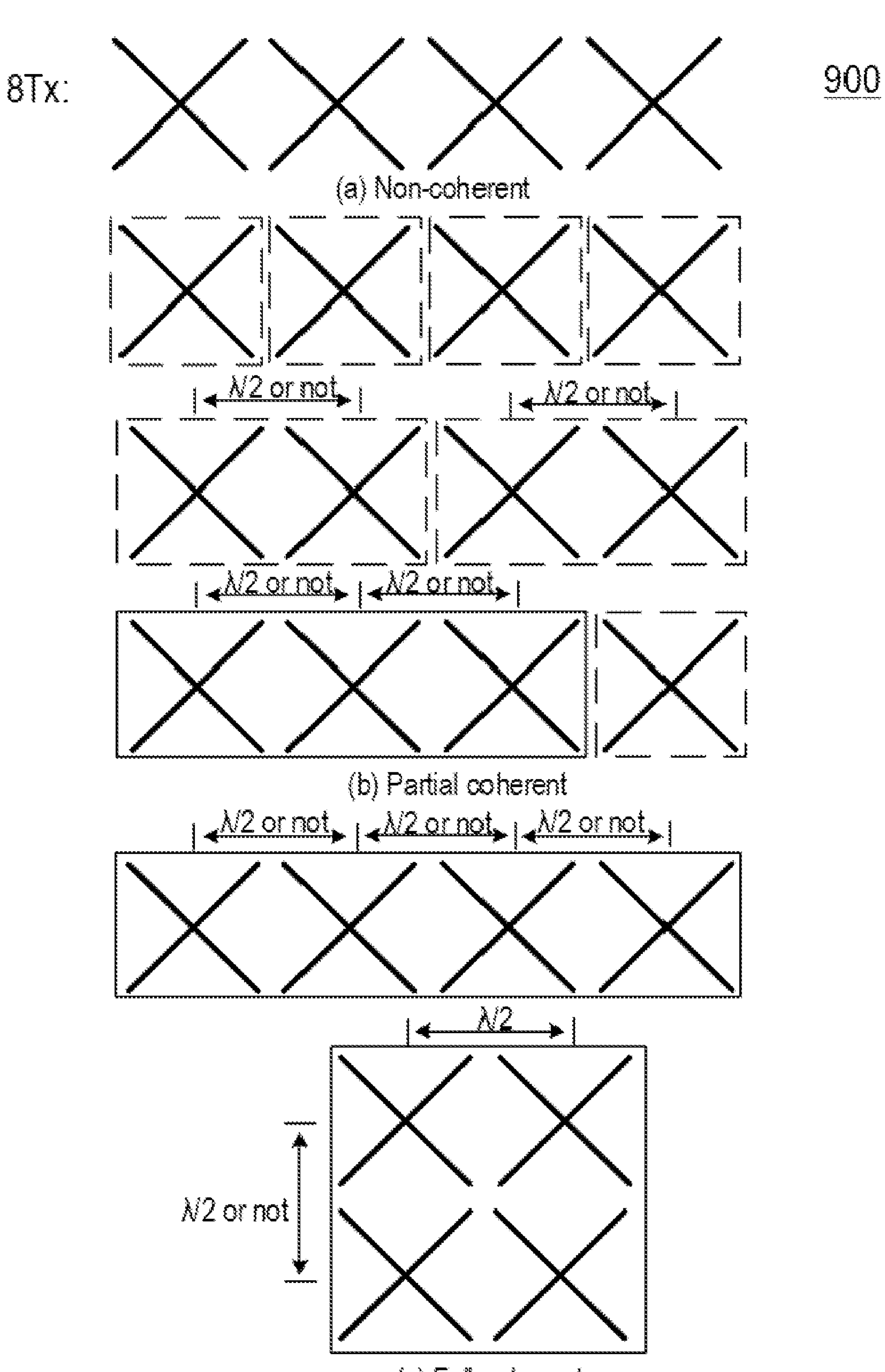

A wireless communication device with 8 Tx antennas (e.g., 8Tx antenna UE) may have at least three candidate architectures. As shown in FIG. 9, the at least three candidate architectures may include a non-coherent architecture, a partial coherent architecture, and/or a full coherent architecture. Compared to a wireless communication device with 6 Tx antennas, in a full coherent scenario, a 1*4 or 2*2 architecture (e.g., (N1, N2)=(2,2) or (4,1)) can be considered. In some embodiments, N1 can indicate and/or correspond to a number of horizontal antenna elements on one polarization. In some embodiments, N2 may indicate and/or specify a number of vertical antenna elements on one polarization.

For a non-coherent wireless communication device, if a number of layers does not exceed four layers, port selection can be used, and/or a portion of the antenna ports may be powered off.

For a partial coherent wireless communication device, a combination of {2, 2, 2, 2}, {4, 4} and/or {6, 2} can be considered.

For a coherent wireless communication device (as previously mentioned), at least two different/separate/distinct wireless communication device architectures can be considered (e.g., (N1,N2)=(2,2) or (1,4)).

B. Embodiment 2: Uplink (UL) Precoding Based on a Port Group

In some embodiments, a mapping, relationship, and/or association between one or more antenna ports (or SRS ports) and a port group (e.g., grouping antenna ports into one or more port groups) can be configured/indicated. The mapping/association can be configured by a command (e.g., RRC, MAC-CE, and/or DCI signaling) to facilitate a unified solution (e.g., configurable codebook).

In certain embodiments, mapping and/or enabling a port group can be performed via a command (e.g., a bitmap). For instance, a bit in a bitmap may be associated with a port group. As such, if the bit has a value of 1 (or other values), the port group associated with the bit can be enabled.

In some embodiments, a precoding information can be provided per port group according to the following formula, wherein m indicates a number of port groups. If the port group is disabled, the corresponding precoding $W_i$ can be NULL. As such, a corresponding column/row vector may be canceled/deactivated/shutdown.

$$W = \begin{bmatrix} W_1 & 0 & \dots & 0 \\ 0 & W_2 & \dots & 0 \\ \vdots & \vdots & \ddots & \vdots \\ 0 & 0 & \dots & W_m \end{bmatrix}$$

In a reporting of the capability of the wireless communication device, the port group information (e.g., a number of port groups, a number of ports per group, and/or a port/antenna architecture (such as a number N1 and N2, and/or a spatial distance between two neighboring antenna elements)) can be reported, specified, and/or indicated.

Furthermore, the wireless communication device may receive a plurality of configured transmission modes from the wireless communication node. For instance, each mode may correspond to at least one of a coherent type, a number of port groups, a number of ports per group, and/or a codebook type (e.g., based on a Type I codebook and/or a Rel-15 TPMI codebook).

In some embodiments, the wireless communication device can be configured with a plurality of modes (e.g., non-coherent+partial-coherent+coherent, non-coherent only, partial-coherent only, and non-coherent only).

If a combination mode (e.g., non-coherent+partial-coherent+coherent) is configured, at least one of: non-coherent+partial-coherent+coherent can be selected and/or indicated by another command (e.g., MAC-CE and/or DCI).

If one of the modes is activated and/or applied, the port group architecture can be determined.

The same precoding information (e.g., port group common precoding information) can be based on a reporting of the wireless communication device and/or a configuration of the wireless communication node.

In some embodiments, a co-phase can be provided per port group. For example, a co-phase of a first group can be fixed/set/configured to 1. The wireless communication node may indicate and/or specify the co-phase of the other groups.

From a precoding perspective, a spatial domain precoding can be provided based on a DFT codebook as follows:

A spatial domain precoding for an i-th path at uniformly spaced and coherent N antenna elements can be provided according to the following formula, wherein O represents an oversampling ratio (e.g., O=1, 2, 4).

$$w_{m_i} = \left[ 1 \quad e^{j\frac{2\pi m_i}{NO}} \quad \ldots \quad e^{j\frac{2\pi(N-1)m_i}{NO}} \right]$$

Considering a frequency-correlation, one or more frequency domain vectors may be considered for a coefficient-value corresponding to an i-th path for one or more layer transmissions at coherent N3 TPMI granularity (e.g., N3=N_subband*R). In some embodiments, the N_subband can indicate a number of sub-bands. In some embodiments, an R can specify a scaling factor (e.g., R=1, 2).

$$c_{\phi_i} = \left[ 1 \quad e^{j\frac{2\pi\phi_i}{N_3}} \quad \ldots \quad e^{j\frac{2\pi(N_3-1)\phi_i}{N_3}} \right]$$

In some embodiments, a candidate TPMI table (such as table 400 and/or table 500) can be explicitly provided.

Figure 10:
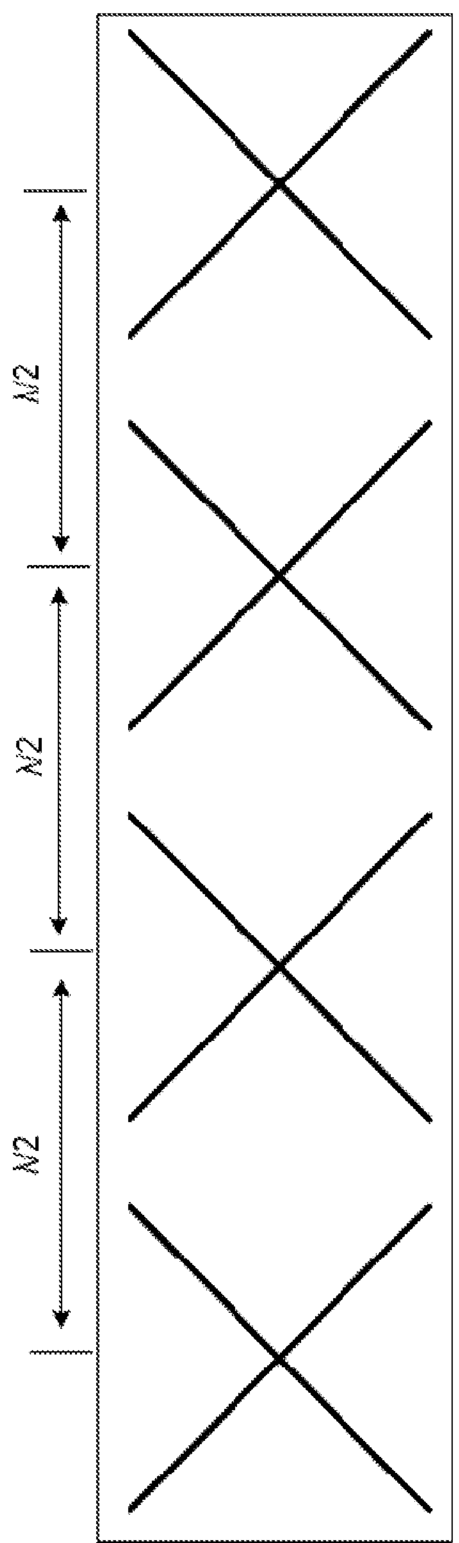

For instance, an 8-Tx full coherent wireless communication device (e.g., N1=4, N2=1) can be reported by the wireless communication device to the wireless communication node (e.g., as shown in FIG. 10). As such, the wireless communication device can be configured (e.g., using an RRC command and/or or other commands) with a mode of coherent+partial coherent+non-coherent. The partial coherent mode can be configured to the mode (2, 2).

In MAC-CE, at least one of {coherent, partial coherent, non-coherent} can be activated.

In certain embodiments, a coherent scenario can include a single port group. As such, the precoding information can be indicated for the single port group (e.g., based on DFT-based codebook);

In a partial coherent scenario:

There are at least two port groups, each of which can refer to 4 ports with (N1=2, N2=1).

As such, at least two examples of a DCI signaling design can be considered:

Case #1: In the DCI, information about the enabled port groups (e.g., by 2-bit) and/or the precoding information per group can be indicated.

Case #2: A precoding information may include a NULL value for disabling the port group. In certain embodiments, a reserved bit may be indicated in the precoding information field, wherein the reserved bit can indicate that the port group is disabled.

In some embodiments, RANK information and/or precoding information can be jointly encoded in a field. The RANK for the entire transmission can be equal to the sum of the RANK per port group.

In some embodiments, the maximum number of the RANK can be configured per port group and/or per BWP.

In certain embodiments, a mapping between a port group and an UL codeword may facilitate and/or enable UL parameter indication.

C. Embodiment 3: Unified Solution for Frequency Selective Precoding

For frequency selective precoding, precoding information can be provided per RB set and/or per subband, rather than providing a single precoding information for an entire band. In some embodiments, the precoding information may be provided per RB set and/or per subband. However, the DCI overhead may become intolerable/inadequate. For instance, 6 bits can be used for a 4-Tx wireless communication device. If introducing frequency selective precoding increases the number of subbands to 16 (or other values), 92-bits (or other numbers of bits) can be required for a DCI command, which can be excessive for the DCI command (e.g., an increased DCI overhead).

In order to reduce the TPMI overhead, a differential TPMI (e.g., per layer and/or per subband) for subband precoding can be introduced/used. A phase/delay corresponding to each TPMI may be further considered.

To determine the precoding information for a subband, a 'Mod' function and/or a same RANK (WB) may be needed.

For instance, an initial precoding information index M can be provided for subband #0. As such, for suband#i, the precoding information may be $W_{floor\ (i*step+M)modX}$. The X can indicate a total number for a given RANK. In some embodiments, the "step" may indicate a step size. One example of said implementation can be seen in FIG. 11.

For RANK>1, the 'Mod' function may be performed per layer.

In some embodiments, a detailed mathematical $W_i$ for a given port group-i with uniform space (e.g., λ/2), each of which is coherent, may be provided and/or used.

Layer-1: The $b_{k1,k2}$ can specify the 2-D DFT codebook with indexes of $k_1$ and $k_2$. The $i_{1,1}$ and $i_{1,2}$ may indicate the beam group index (e.g., a precoding group index) in a horizontal and vertical domain, respectively. The s1 and s2 may specify an offset (e.g., number of beam per group) in a horizontal and vertical domain, respectively. The $c_{r,0}$ can indicate a co-phase between different polarizations and layers.

$$W_i = \frac{1}{\sqrt{2N_1N_2}} \times \begin{bmatrix} w_{0,0} \\ w_{1,0} \end{bmatrix}, w_{r,0} = b_{k_1,k_2} \times c_{r,0}$$

$$k_1 = i_{1,1} \times s_1 + p_1, k_2 = i_{1,2} \times s_2 + p_2$$

Layer-2 to Layer-8: The $b_{k_1+k'_{1,l},k_2+k'_{2,1}}$ can specify the 2-D DFT codebook with indexes of $k_1$ and $k_2$. The $i_{1,1}$ and $i_{1,2}$ may indicate a beam group selection. The $k'_{1,l}$ and $k'_{2,1}$ can specify a beam selection from a beam group (e.g., a precoding selection/indication from a precoding group). The $c_{r,l}$ may specify a co-phase between different polarizations and layers.

$$W_i = \frac{1}{\sqrt{2RN_1N_2}} \times \begin{bmatrix} w_{0,0} & w_{0,1} & \dots & w_{0,R-1} \\ w_{1,0} & w_{1,1} & \dots & w_{1,R-1} \end{bmatrix}, R + \{2, 3, \dots, 8\}$$

$$w_{r,l} + b_{k_1+k'_{1,l},k_2+k'_{2,l}} \times c_{r,l}$$

For saving/reducing/decreasing overhead, for a given port group with uniform space, one or more wideband (WB) parameters and/or a subband (SB) parameters may be considered/determined.

Example 1

WB parameter(s): A beam group selection.

SB parameter(s): A beam selection from a beam group and/or a co-phase for each subband.

Co-phase: differential or based on DFT, and/or a stepping coefficient (e.g., per candidate beam)

Example 2

WB parameter(s): A beam group selection and/or a beam selection from a beam group (e.g., beam selection).

SB parameter(s): A co-phase for each subband.

For a non-uniformly spatial port group, the precoding may be updated as follows (e.g., compared to the case of a uniform spatial port group).

Case #1: A precoding matrix can be port group common. In one example, the same precoding matrix, b, can be applied to one or more polarizations and layers for one given port group. However, each polarization and/or layer for the given port group may have an independent co-phase.

$$w_{r,l} + b_{k_1+k'_{1,l},k_2+k'_{2,l}} \times c_{r,l} \xrightarrow{\text{Case \#1}} w_{p,r,l} + b_{k_1+k'_{1,l},k_2+k'_{2,l}} \times c_{p,r,l}$$

Case #2: A precoding matrix can be specific to a port group. In one example, independent/separate/distinct co-phases may be provided per polarization per layer per port group.

$$w_{r,l} = b_{k_1+k'_{1},k_2+k'_{2,l}} \times c_{r,l} \xrightarrow{\text{Case \#2}} w_{p,r,l} = b_{k_{1,p}+k'_{1,p,l},k_{2,p}+k'_{2,p,l}} \times c_{p,r,l}$$

In some embodiments, a co-phase for each port group can be indicated per SB.

In certain embodiments, a co-efficient of '0' can be provided for different port groups.

For example, one or more combinations of WB and/or SB parameters can be activated by a MAC-CE and/or RRC command, while another combination may be indicated by the DCI command.

D. Embodiment 4: Flexible Signaling for Indicating Frequency Selective Precoding In order to reduce and/or decrease a DCI overhead with frequency selective gain, one or more of the following aspects can be selected for enhancement.

In some embodiments, a single MCS may be indicated. In certain embodiments, a MCS per codeword (CW)/transmission block (TB) may be indicated (e.g., 2 MCS for 2 CW/TB).

For the RI:

- A separate indication for the RI and/or the number of layers per port groups can be used.
- Furthermore, a first field can be used to provide precoding information and/or the RI for the first subband. The RI may be applied to the rest of the subbands.

An indication of a granularity of a precoding information (e.g., the size of subband).

- Furthermore, the granularity of the precoding information can be determined according to (or based on) the number of RBs, the sub-carrier spacing, the total number of SRS resources, the number of SRS ports, and/or the number of antenna ports.
- In certain embodiments, a frequency selective precoding may be enabled if at least one of the following conditions is met/satisfied:
  - A number of SRS ports and/or a number of antenna ports is greater than or equal to a threshold.
  - A number of RBs of a transmission and/or a BWP/CC carrying the transmission is greater than or equal to a threshold.
  - A RANK and/or a number of layers of a transmission is greater than or equal to a threshold (e.g., >=2 layer transmission).
- In some embodiments, a capability of the wireless communication device may report, specify, and/or indicate a candidate value of the granularity of the precoding information.
- In some embodiments, the wireless communication device can configure one or more granularities based on a RRC and/or MAC-CE command. At least one granularity can be indicated by the DCI and/or MAC-CE.
- In some embodiments, the granularity may be based on a number of RBs (e.g., 8 and/or 16 RBs) and/or sub-bands (e.g., half or quarter scheduled PRB). In certain embodiments, the granularity can be based on the entire RBs and/or BWP, regardless of a scheduled RB.

Example-1: The granularity of the size of the RB of the precoding resource block (RB) sets (e.g., a granularity for a same precoding information) can be indicated by R. As such, the precoding RB sets may partition and/or divide 'the scheduled RBs for a given transmission' or 'RBs in a BWP/CC' with R RBs (e.g., R consecutive RBs).

The size of the first RB set may be given by (R-N_start) mod R.

The size of the last RB set may be given by (N_sumRB+N_start) mod R, if the (N_sumRB+N_start) mod R is unequal to 0. Otherwise, the size of the last RB set can be specified by R.

For 'the scheduled RBs for a given transmission', the N_sumRB and N_start can indicate a total number of RBs and an index of the first RB in a given transmission (e.g., for a PUSCH transmission).

For 'RBs in a BWP/CC', the N_sumRB and N_start may specify a total number of RBs and an index of the first RB for a BWP or CC (e.g., for a PUSCH transmission).

For other RB sets, the size can be given by R.

For example, R=8 and/or a precoding RB set partition can be 'RBs in a BWP/CC' from 60-RB to 92-RB. As such, based on the above rule:

The first RB set can be from 60-RB to 63-RB.

The second RB set may be from 64-RB to 71-RB.

The third RB set may be from 72-RB to 79-RB.

The fourth RB set may be from 80-RB to 87-RB.

The fifth RB set may be from 88-RB to 92-RB.

Example-2: The granularity of the number of precoding RB sets, wherein the 'scheduled RBs for a given transmission' and/or the 'RBs in BWP/CCs' are divided into T consecutive RBs.

A size of a first and/or last RB may be given by N_sumRB-floor(N_sumRB/T)*(T−1).

Otherwise, the size of the RB can be given by floor(N_sumRB/T).

For example, T=4, and/or the precoding RB set partition can be 'scheduled RBs for a transmission' from 50-RB to 72-RB. As such, based on the above rule, the size of the last RB can be given by N_sumRB-floor(N_sumRB/T)*(T−1).

The first RB set can be from 50-RB to 54-RB.

The second RB set may be from 55-RB to 59-RB.

The third RB set may be from 60-RB to 64-RB.

The fourth RB may be from 65-RB to 72-RB.

In some embodiments, at least one of: the MCS, the RI, and/or the WB-precoding information may be indicated by a first DCI (e.g., DCI format 0_0/1/2) and/or a MAC-CE. Another SB-precoding information (e.g., including co-phases) can be indicated by a second DCI.

The first DCI and the second DCI can have a same HARQ process number. In some embodiments, the first DCI and the second DCI can be associated (e.g., based on associated search space sets)

In some embodiments, at least one of a first DCI and/or a second DCI can meet at least one of the following conditions for indicating the corresponding DCI with a DL/UL assignment:

A HARQ process number field of a DCI can be set/configured to a specific value (e.g., all '0's, and/or pre-configured by the RRC command).

A redundancy version field of a DCI can be set to a specific value (e.g., all '0's).

A modulation and coding scheme (MCS) field of the DCI may be set to a specific value (e.g., all '1's).

A frequency domain resource assignment field of the DCI may be set to a specific value (e.g., all '0's or all '1's).

An uplink or downlink shared channel indicator field of the DCI may be set to a specific value (e.g., '1' or '0').

In some embodiments, the "all '0's" and "all '1's" can indicate that all the bits of the corresponding DCI field are equal to '0' or '1'.

In order to achieve flexible signaling to indicate parameters for up to 8 Tx and frequency selective precoding, an RRC configuration and/or RRC+MAC-CE/DCI configuration can be used for a set of transmission parameters.

The set of transmission parameters can include at least one of: a coherent type, a number of antenna ports, a number of port groups, a number of antenna ports for a port group, a combination of one or more port groups, a number of ranks, a number of ranks for a port group, a combination of ranks, a granularity of precoding information, a number of precoding information, a number of subbands, a size of a subband, and/or a codebook type.

In some embodiments, the wireless communication device can report one or more candidate parameter sets in a capability signaling (e.g., support of 8 antenna ports, two types of antenna port combinations (of {2 antenna ports, 2 antenna ports, 2 antenna ports, 2 antenna ports} and/or {4 antenna ports, 4 antenna ports}), and/or a maximum number of ranks=4).

For example, based on the information, the wireless communication device can receive one RRC configuration of one set of transmission parameters in the RRC (e.g., one antenna port combination {4 antenna ports, 4 antenna ports} is enabled, and/or a maximum number of ranks=4 for PUSCH transmission).

In one example, based on the information, the wireless communication device can configure two sets of transmission sets (e.g., Set-1 (one antenna port combination {4 antenna ports, 4 antenna ports} is enabled, and/or a maximum number of ranks=4 for PUSCH transmission') and/or Set-2 (one antenna port combination {2 antenna ports, 2 antenna ports, 2 antenna ports, 2 antenna ports} is enabled, maximum number of ranks=4 for PUSCH transmission'). At least one of the two sets can be activated and/or indicated by the MAC-CE/DCI command.

I. Selective Precoding of Uplink Frequency

Figure 12:
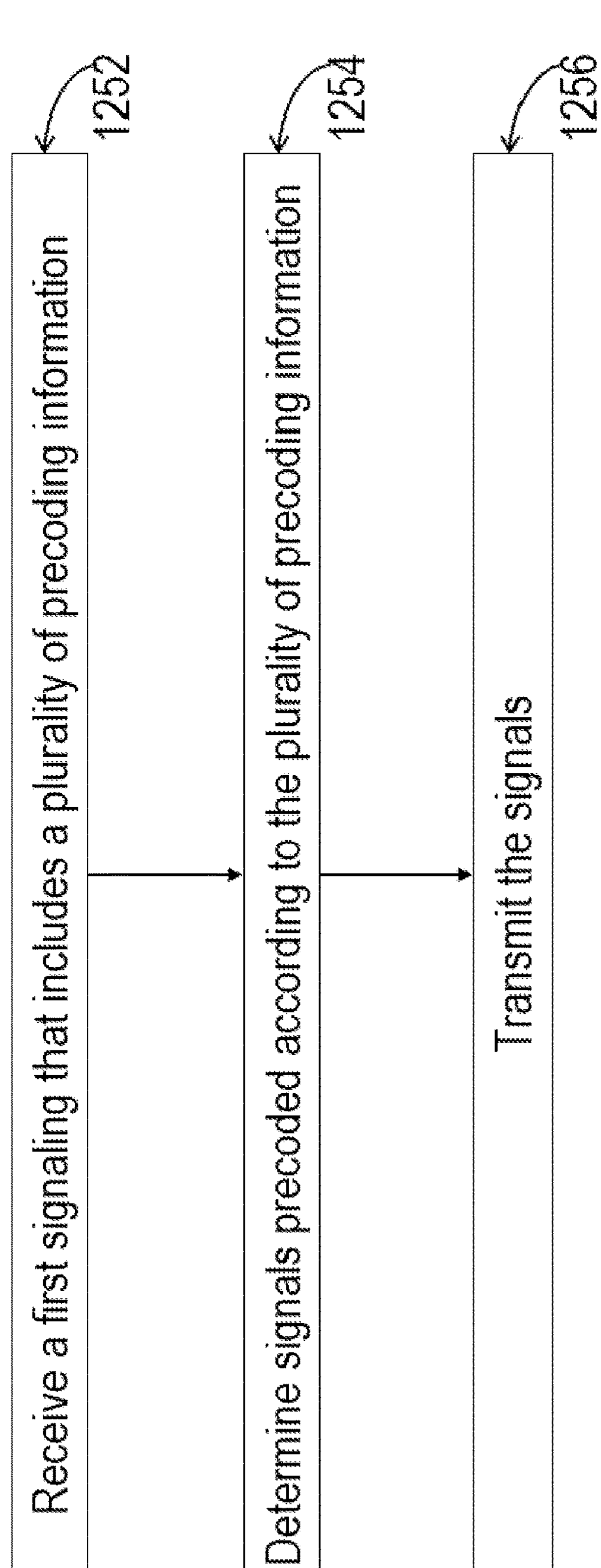
FIG. 12 illustrates a flow diagram of an example method for selectively precoding an UL frequency, in accordance with an embodiment of the present disclosure.

FIG. 12 illustrates a flow diagram of a method 1250 for selective precoding of uplink frequencies. The method 1250 may be implemented using any of the components and devices detailed herein in conjunction with FIGS. 1-11. In overview, the method 1250 may include receiving a first signaling that includes a plurality of precoding information (1252). The method 1250 may include determining signals precoded according to the plurality of precoding information (1254). The method 1250 may include transmitting the signals (1256).

Referring now to operation (1252), and in some embodiments, a wireless communication device (e.g., a UE) may receive and/or obtain a first signaling from the wireless communication node. The first signaling may include a plurality of precoding information (e.g., PMI, TPMI, precoding and/or beam information). The precoding information can be associated with (or mapped to) a plurality of port groups (e.g., antenna group, antenna port group, and/or UE port group). In some embodiments, the wireless communication device may receive and/or obtain a second signaling (e.g., RRC signaling, MAC-CE signaling, DCI signaling, and/or other types of signaling). The first signaling and/or the second signaling may include mapping information. The mapping information can associate, relate, and/or map each of the plurality of precoding information with a corresponding one of the plurality of port groups. In certain embodiments, each of the plurality of precoding information can be associated with a corresponding one of the plurality of port groups, according to an order (e.g., according to an order of the precoding information or an order of the port groups). In some embodiments, the first signaling may include a first flag, a codepoint in a field of DCI, a first bit value in a bitmap, and/or a first matrix element value (e.g., $W_i$ W in W). The first flag, the first bit value in the bitmap, and/or the first matrix element value may indicate and/or specify whether a first port group of the plurality of port groups is enabled or disabled. In one example, the first flag, the first bit value in the bitmap, and/or the first matrix element value may indicate whether a first of the plurality of precoding information that corresponds to a first port group of the plurality of port groups is a matrix with all elements of zero. In certain embodiments, the first port group of the plurality of port groups can be disabled. When the first port group of the plurality of port groups is disabled, the precoding information corresponding to the first port group may be precluded from the determining of the signals (e.g., determining signals precoded according to the plurality of precoding information).

In some embodiments, the wireless communication device may send, transmit, and/or broadcast capability reporting of the wireless communication device to the wireless communication node. The capability reporting may include and/or provide information comprising at least one of: the number of port groups, the number of ports per port group, the number of horizontal antenna elements on one polarization (e.g., N1), the number of vertical antenna elements on one polarization (e.g., N2), information related to distance between two antenna elements or two port groups, coherent type, number of antenna ports for a port group, combination of one or more port groups, number of ranks, number of ranks for a port group, combination of ranks, granularity of precoding information, number of precoding information, number of subbands, size of a subband, and/or codebook type. The number of horizontal antenna elements on one polarization may indicate a number of antenna elements in a horizontal domain for one type of polarization. The number of vertical antenna elements on one polarization may indicate a number of antenna elements in a vertical domain for one type of polarization.

In some embodiments, the wireless communication device may receive a configuration. The configuration may include and/or indicate at least one of: a coherent type, a number of antenna ports, a number of port groups, a number of antenna ports for a port group, a combination of one or more port groups, a number of ranks, a number of ranks for a port group, a combination of ranks, a granularity of precoding information, a number of precoding information, a number of subbands, a size of a subband, and/or codebook type. In certain embodiments, the wireless communication device may receive (e.g., via a signaling) a configuration of a plurality of transmission modes. Each transmission mode can include and/or provide at least one of: a coherent type (e.g., non-coherent, partial coherent, full coherent, and/or a combination), number of antenna ports, number of port groups, number of antenna ports for a port group, combination of one or more port groups, number of ranks, number of ranks for a port group, combination of ranks, granularity of precoding information, number of precoding information, number of subbands, size of a subband, and/or codebook type. In some embodiments, the wireless communication device may receive the configuration(s) via the first signaling and/or the second signaling (or other types of signaling). In certain embodiments, the configuration(s) may include or correspond to an RRC configuration and/or other types of configurations. In some embodiments, the wireless communication device may receive/obtain a selection of one of the plurality of transmission modes from the wireless communication node. The wireless communication device may receive the selection via the first signaling and/or other types of signaling, such as a signaling different from the signaling in which the configuration(s) is (or are) received.

In some embodiments, the combination of one or more port groups may comprise at least one of: {1 antenna port, 1 antenna ports}, {2 antenna ports}, {1 antenna port, 1 antenna ports, 1 antenna port, 1 antenna port}, {2 antenna ports, 2 antenna ports}, {4 antenna ports}, {1 antenna port, 1 antenna ports, 1 antenna port, 1 antenna port, 1 antenna ports, 1 antenna port}, {2 antenna ports, 2 antenna ports, 2 antenna ports}, {4 antenna ports, 2 antenna ports}, {3 antenna ports, 3 antenna ports}, {6 antenna ports}, {1 antenna port, 1 antenna ports, 1 antenna port, 1 antenna port, 1 antenna ports, 1 antenna port, 1 antenna ports, 1 antenna port}, {2 antenna ports, 2 antenna ports, 2 antenna ports, 2 antenna ports}, {2 antenna ports, 2 antenna ports, 4 antenna ports}, {6 antenna ports, 2 antenna ports}, {4 antenna ports, 4 antenna ports} and/or {8 antenna ports}. In certain embodiments, the first signaling may comprise co-phase information. The co-phase information may correspond to one or more of the plurality of port groups. In one example, co-phase information can be provided per port group, but the co-phase for the first group can be fixed/set/configured to 1. The co-phase information of the other groups can be indicated by the wireless communication node. In some embodiments, at least one of the plurality of port groups may be full coherent. If at least one of the plurality of port groups is full coherent, a distance between two port groups may be a non-restricted value, and/or is $K^*\lambda$. In some embodiments, the $\lambda$ denotes a wave-length. In some embodiments, the K can be a defined value and/or a value reported in a capability signaling.

Referring now to operation (1254), and in some embodiments, the wireless communication device may determine signals precoded according to the plurality of precoding information. In certain embodiments, the signals may include or correspond at least one of: a physical uplink shared channel (PUSCH), a physical uplink control channel (PUCCH), and/or a demodulation reference signal (DMRS). In some embodiments, the plurality of precoding information (e.g., PMI, TPMI, precoding or beam information) may comprise a differential transmit precoding matrix index (TPMI) per layer and/or subband. In certain embodiments, the wireless communication device may determine first precoding information for a first subband using a Mod function. The Mod function can be performed per layer. In certain embodiments, one of the plurality of precoding information may correspond to a subband. In some embodiments, the wireless communication device may receive the first signaling and/or a second signaling (e.g., DCI and/or other types of signaling) from the wireless communication node. The first/second signaling may include at least one of: a MCS per codeword or transmission block, a RI or number of layers per port group, a field that provides a RI and precoding information for a first subband, a number of precoding information, a number of subbands, a size of a subband, and/or a granularity of precoding information. In some embodiments, the RI can be applied to all other subbands, or fields that provide precoding information and a same RI for all other subbands.

In certain embodiments, a size of a subband and/or a size of a granularity of precoding information can be determined according to a configuration parameter. The configuration parameter may be related to (or associated with): the granularity of precoding information, a number of resource blocks (RBs) corresponding to the signals, index of a starting RB corresponding to the signals, a number of subbands, a subcarrier spacing (SCS), a total number of resource blocks for a component carrier (CC) or a bandwidth part (BWP), index of a starting RB corresponding to the CC or the BWP, a total number of SRS resources, and/or a number of SRS ports or antenna ports. In some embodiments, a Mod function may be performed (e.g. by the wireless communication device) for determining a size of first or last subband of the signals. In certain embodiments, a floor function can be performed (e.g., by the wireless communication device) for determining a size of each subband of the signals. In certain embodiments, a number of subcarrier spacing (SRS) ports or antenna ports may be greater than or equal to a first threshold. In some embodiments, a number of resource blocks (RBs) for a transmission or a bandwidth part (BWP) or component carrier (CC) carrying the transmission may be greater than or equal to a second threshold. In certain embodiments, a rank or number of layers for the transmission can be greater than or equal to a third threshold. In some embodiments, at least one candidate value of: a granularity of precoding information, a number of precoding information, a number of subbands, and/or a size of a subband, may be reported as user equipment (UE) capability (e.g., a capability of the wireless communication device).

Referring now to operation (1256), and in some embodiments, the wireless communication device may transmit, send, broadcast, and/or communicate the signals to the wireless communication node. As such, the wireless communication node may receive signals precoded by the wireless communication device according to the plurality of precoding information. In certain embodiments, the wireless communication device may transmit, send, and/or broadcast the signals via N antenna ports. In one example, the parameter N may include or correspond to 1, 2, 4, 6 and/or 8 (or other values). In some embodiments, when N is 2, the N antenna ports may be formed from a combination of port groups of {1 antenna port, 1 antenna ports} and/or {2 antenna ports}. In one example, when N is 4, the N antenna ports may be formed from a combination of port groups of {1 antenna port, 1 antenna ports, 1 antenna port, 1 antenna port}, {2 antenna ports, 2 antenna ports} and/or {4 antenna ports}. In some embodiments, when N is 6, the N antenna ports can be formed from a combination of port groups of {1 antenna port, 1 antenna ports, 1 antenna port, 1 antenna port, 1 antenna ports, 1 antenna port}, {2 antenna ports, 2 antenna ports, 2 antenna ports}, {4 antenna ports, 2 antenna ports}, {3 antenna ports, 3 antenna ports} and/or {6 antenna ports}. In one example, when N is 8, the N antenna ports may be formed from a combination of ports groups of {1 antenna port, 1 antenna ports, 1 antenna port, 1 antenna port, 1 antenna ports, 1 antenna port, 1 antenna ports, 1 antenna port}, {2 antenna ports, 2 antenna ports, 2 antenna ports, 2 antenna ports}, {2 antenna ports, 2 antenna ports, 4 antenna ports}, {6 antenna ports, 2 antenna ports}, {4 antenna ports, 4 antenna ports} and/or {8 antenna ports}. In some embodiments, when N is 8, the N antenna ports can be in a (N1, N2) configuration (e.g., which is a (1,4), (2, 2) or (4, 1) configuration). The N1 may indicate and/or specify a number of horizontal antenna elements on one polarization. The N2 may indicate and/or provide a number of vertical antenna elements on one polarization. In certain embodiments, a rank may be same across all subbands. For instance, all subbands and/or resources corresponding to the signals may have a same rank. In some embodiments, the rank and/or precoding information of each of the port groups may be jointly encoded in a field of the second signaling. In certain embodiments, a maximum value of rank may be configured per port group and/or per bandwidth part (BWP). In some embodiments, one or more of the port groups may be associated with (or mapped to) a corresponding uplink codeword.

In certain embodiments, the wireless communication device may receive a second signaling (e.g., RRC and/or MAC-CE signaling) from the wireless communication node. The second signaling may comprise a plurality of parameter configurations for some or all subbands (e.g., SB and/or WB). The wireless communication device may receive/obtain the first signaling and/or a third signaling (e.g., DCI) from the wireless communication node. The third signaling may indicate a first parameter configuration of the plurality of parameter configurations. For example, several combinations of WB and/or SB parameters can be activated by MAC-CE and/or RRC signaling, wherein one combination can be indicated by DCI signaling. In some embodiments, each of the plurality of precoding information may comprise at least one of: precoding group indication, precoding indication, and/or co-phase indication. In certain embodiments, the precoding indication can be for all subbands or the signals. In some embodiments, the co-phase indication may be for a corresponding one of the subbands. In some embodiments, the precoding group indication may be for all subbands (e.g., WB) or the signals. In certain embodiments, the precoding indication from an indicated precoding group, and/or the co-phase indication can be for a corresponding one of the subbands. The precoding group indication and the precoding indication from the indicated precoding group can be for all subbands or the signals. In some embodiments, the co-phase indication may be for a corresponding one of the subbands. In certain embodiments, a precoding matrix can be common to any polarization or layer of any of the port groups. The co-phase may be specific to each polarization or layer. In some embodiments, a precoding matrix may be specific to a corresponding port group. A co-phase can be specific to a polarization or layer of the corresponding port group. In certain embodiments, a co-phase for one of the port groups may be indicated per subband. In some embodiments, a co-efficient between two of the port groups may be 0 or indicated per subband.

In certain embodiments, the wireless communication device may receive a second signaling (e.g., RRC and/or MAC-CE signaling) from the wireless communication node.

The second signaling may comprise one or more granularities of precoding information. The wireless communication device may receive a third signaling (e.g., DCI and/or MAC-CE signaling) from the wireless communication node. The third signaling may indicate a first granularity of one or more granularities. For example, the wireless communication device (e.g., UE) can configure one or more granularities according to RRC and/or MAC-CE signaling. The wireless communication device may configure at least one of the one or more granularities according to DCI and/or MAC-CE signaling. In some embodiments, the second signaling may include at least one of: a MCS, a RI and/or precoding information for all subbands (e.g., WB-precoding information, and/or the precoding information applied to the entire signal or resources of the signal) or the signals. The wireless communication device may receive the first signaling and/or a third signaling (e.g., a second DCI) from the wireless communication node. The third signaling may comprise precoding information for a first subband (e.g., SB-precoding information). In one example, at least one of a MCS, RI, and/or WB-precoding information can be indicated by a first DCI (e.g., DCI format 0_0/1/2) and/or MAC-CE signaling. Another SB-precoding information (including co-phases) may be indicated by a second DCI. In some embodiments, at least two of the first signaling, the second signaling or the third signaling may have a same hybrid automatic request (HARQ) process number. In certain embodiments, a search space of the second signaling can be associated with a search space of the first signaling and/or third signaling. In some embodiments, a HARQ process number field in the first signaling, the second signaling, and/or the third signaling may be set to a specific value. In certain embodiments, a redundancy version field in the first signaling, the second signaling, and/or the third signaling may be set to a specific value. In some embodiments, a MCS field in the first signaling, the second signaling, and/or the third signaling may be set to a specific value. In certain embodiments, a frequency domain resource assignment field in the first signaling, the second signaling, and/or the third signaling can be set to a specific value. In some embodiments, an uplink or downlink shared channel indicator field in the first signaling, the second signaling, and/or the third signaling may be set to a specific value.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method comprising:

receiving, by a wireless communication device from a wireless communication node, a first signaling that includes a plurality of precoding information associated with a plurality of port groups;

receiving, by the wireless communication device from the wireless communication node, a second signaling including mapping information associating each of the plurality of precoding information with a corresponding one of the plurality of port groups;

determining, by the wireless communication device, signals precoded according to the plurality of precoding information;

receiving, by the wireless communication device from the wireless communication node, a configuration including a codebook type; and transmitting, by the wireless communication device to the wireless communication node, the signals.

2. The method of claim 1, comprising:

sending, by the wireless communication device to the wireless communication node, capability reporting of the wireless communication device, which includes information comprising at least one of: a number of port groups, or a number of ports per port group.

3. The method of claim 1, wherein the signals comprise a physical uplink shared channel (PUSCH).

4. The method of claim 1, wherein the configuration further includes a combination of one or more port groups, or codebook type.

5. The method of claim 4, wherein the combination of one or more port groups comprises at least one of: {1 antenna port, 1 antenna ports, 1 antenna port, 1 antenna port, 1 antenna ports, 1 antenna port, 1 antenna ports, 1 antenna port}, {2 antenna ports, 2 antenna ports, 2 antenna ports, 2 antenna ports}, {4 antenna ports, 4 antenna ports} or {8 antenna ports}.

6. The method of claim 1, further comprising:

transmitting, by the wireless communication device via N antenna ports, the signals precoded according to the precoding information, wherein:

when N is 8, the N antenna ports are formed from a combination of ports groups of {1 antenna port, 1 antenna ports, 1 antenna port, 1 antenna port, 1 antenna ports, 1 antenna port, 1 antenna ports, 1 antenna port}, {2 antenna ports, 2 antenna ports, 2 antenna ports, 2 antenna ports}, {4 antenna ports, 4 antenna ports} or {8 antenna ports}.

7. The method of claim 1, further comprising:

receiving, by the wireless communication device from the wireless communication node, the first signaling including at least one of:

a single modulation and coding scheme (MCS) per codeword or transmission block.

8. A method comprising:

transmitting, by a wireless communication node to a wireless communication device, a first signaling that includes a plurality of precoding information associated with a plurality of port groups;

transmitting, by the wireless communication node to the wireless communication device, a second signaling including mapping information associating each of the plurality of precoding information with a corresponding one of the plurality of port groups;

transmitting, by the wireless communication node to the wireless communication device, a configuration including a codebook type; and receiving, by the wireless communication node from the wireless communication device, signals precoded by the wireless communication device according to the plurality of precoding information.

9. A wireless communication device, comprising:

at least one processor configured to:

receive, via a transceiver from a wireless communication node, a first signaling that includes a plurality of precoding information associated with a plurality of port groups;

receive, via the transceiver from the wireless communication node, a second signaling including mapping information associating each of the plurality of precoding information with a corresponding one of the plurality of port groups;

determine signals precoded according to the plurality of precoding information;

receive, via the transceiver from the wireless communication node, a configuration including a codebook type; and transmit, via the transceiver to the wireless communication node, the signals, receive, via the transceiver, the configuration further including a combination of one or more port groups.

10. A wireless communication node, comprising:

at least one processor configured to:

transmit, via a transceiver to a wireless communication device, a first signaling that includes a plurality of precoding information associated with a plurality of port groups;

transmit, via the transceiver to the wireless communication device, a second signaling including mapping information associating each of the plurality of precoding information with a corresponding one of the plurality of port groups;

transmit, via the transceiver to the wireless communication device, a configuration including a codebook type; and receive, via the transceiver from the wireless communication device, signals precoded by the wireless communication device according to the plurality of precoding information.

11. The wireless communication node of claim 10, wherein the at least one processor is configured to:

send, via the transceiver to the wireless communication node, capability reporting of the wireless communication device, which includes information comprising at least one of: a number of port groups or a number of ports per port group.

12. The wireless communication node of claim 10, wherein the signals comprise a physical uplink shared channel (PUSCH).

13. The wireless communication node of claim 10, wherein the at least one processor is configured to:

receiving, by the wireless communication device from the wireless communication node, the first signaling including at least one of:

a single modulation and coding scheme (MCS) per codeword or transmission block.

14. The wireless communication node of claim 13, wherein the combination of one or more port groups comprises at least one of: {1 antenna port, 1 antenna ports, 1 antenna port, 1 antenna port, 1 antenna ports, 1 antenna port, 1 antenna ports, 1 antenna port}, {2 antenna ports, 2 antenna ports, 2 antenna ports, 2 antenna ports}, {4 antenna ports, 4 antenna ports} or {8 antenna ports}.

* * * * *